US011153833B2

(12) United States Patent
Balachandran et al.

(10) Patent No.: US 11,153,833 B2
(45) Date of Patent: *Oct. 19, 2021

(54) METHOD FOR MODIFYING PARAMETER VALUES FOR LONG RANGE EXTENSION AND CORRESPONDING NODE

(71) Applicant: Telefonaktiebolaget LM Ericsson (publ), Stockholm (SE)

(72) Inventors: Kumar Balachandran, Pleasanton, CA (US); Johan Bergman, Stockholm (SE); Konstantinos Dimou, San Francisco, CA (US); Erik Eriksson, Linköping (SE); Anders Wallén, Ystad (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/829,863

(22) Filed: Mar. 25, 2020

(65) Prior Publication Data

US 2020/0229109 A1 Jul. 16, 2020

Related U.S. Application Data

(63) Continuation of application No. 16/229,268, filed on Dec. 21, 2018, now Pat. No. 10,631,253, which is a
(Continued)

(51) Int. Cl.
*H04W 52/24* (2009.01)
*H04B 17/18* (2015.01)
(Continued)

(52) U.S. Cl.
CPC .......... *H04W 52/245* (2013.01); *H04B 17/18* (2015.01); *H04B 17/23* (2015.01);
(Continued)

(58) Field of Classification Search
CPC . H04W 76/027; H04W 76/045; H04W 24/04; H04W 36/08; H04W 4/005;
(Continued)

(56) References Cited

U.S. PATENT DOCUMENTS 6,751,444 B1 6/2004 Meiyappan
8,805,446 B2* 8/2014 Dominguez Romero ..................
H04W 16/08
455/561
(Continued)

FOREIGN PATENT DOCUMENTS

CN 103650592 A 3/2014
EP 1928134 A2 6/2008
(Continued)

OTHER PUBLICATIONS

Author Unknown, "Technical Specification Group Radio Access Network; Evolved Universal Terrestrial Radio Access (E-UTRA); Physical layer procedures (Release 8)," Technical Specification 36.213, Version 8.8.0, 3GPP Organizational Partners, Sep. 2009, 77 pages.
(Continued)

*Primary Examiner* — Rina C Pancholi
(74) *Attorney, Agent, or Firm* — Withrow & Terranova, PLLC

(57) ABSTRACT

Systems and methods are disclosed for adjusting Radio Link Monitoring (RLM), Radio Link Failure (RLF) detection, RLF recovery, and/or connection establishment failure detection for wireless devices (16) in a cellular communications network (10) depending on mode of operation. In one embodiment, a node (14, 16) in the cellular communications network (10) determines whether a wireless device (16) (e.g., a Machine Type Communication (MTC) device) is to operate in a long range extension mode of operation or a normal mode of operation. The node (14, 16) then applies
(Continued)

different values for at least one parameter depending on whether the wireless device (16) is to operate in the long range extension mode or the normal mode. The at least one parameter includes one or more RLM parameters, one or more RLF detection parameters, and/or one or more RLF recovery parameters. In doing so, signaling overhead and energy consumption within the wireless device (16) when operating in the long range extension mode is substantially reduced.

17 Claims, 17 Drawing Sheets

Related U.S. Application Data continuation of application No. 14/441,479, filed as application No. PCT/SE2013/051335 on Nov. 13, 2013, now Pat. No. 10,194,402.

(60) Provisional application No. 61/725,921, filed on Nov. 13, 2012.

(51) Int. Cl.

| | | |
|---|---|---|
| *H04B 17/23* | (2015.01) | |
| *H04W 52/02* | (2009.01) | |
| *H04W 76/18* | (2018.01) | |
| *H04W 4/70* | (2018.01) | |
| *H04W 76/25* | (2018.01) | |
| *H04B 17/391* | (2015.01) | |
| *H04L 7/00* | (2006.01) | |
| *H04L 12/26* | (2006.01) | |
| *H04W 24/04* | (2009.01) | |
| *H04W 36/08* | (2009.01) | |

(52) U.S. Cl.
CPC ....... *H04B 17/3913* (2015.01); *H04L 7/0054* (2013.01); *H04L 43/0811* (2013.01); *H04W 4/70* (2018.02); *H04W 24/04* (2013.01); *H04W 36/08* (2013.01); *H04W 52/0216* (2013.01); *H04W 52/0219* (2013.01); *H04W 52/0245* (2013.01); *H04W 76/18* (2018.02); *H04W 76/25* (2018.02); *Y02D 30/70* (2020.08)

(58) Field of Classification Search
CPC ......... H04W 52/0216; H04W 52/0219; H04W 52/0245; H04W 52/245; H04B 17/18; H04B 17/23; H04B 17/3913; H04L 43/0811; H04L 7/0054
See application file for complete search history.

(56) References Cited

U.S. PATENT DOCUMENTS

| | | | |
|---|---|---|---|
| 8,874,126 B2 | 10/2014 | Jeong et al. | |
| 10,097,990 B2 | 10/2018 | Balachandran et al. | |
| 10,123,356 B2 | 11/2018 | Axmon et al. | |
| 10,194,402 B2* | 1/2019 | Balachandran | H04B 17/3913 |
| 10,631,253 B2 | 4/2020 | Balachandran et al. | |
| 2004/0052230 A1 | 3/2004 | Soliman | |
| 2004/0125776 A1 | 7/2004 | Haugli et al. | |
| 2007/0010256 A1* | 1/2007 | Klabunde | G16H 40/67 455/452.2 |
| 2007/0286155 A1* | 12/2007 | Kaikkonen | H04W 52/0209 370/350 |
| 2009/0042582 A1 | 2/2009 | Wang et al. | |
| 2009/0207826 A1 | 8/2009 | Bitran et al. | |
| 2010/0304738 A1 | 12/2010 | Lim | |
| 2010/0329211 A1* | 12/2010 | Ou | H04W 72/005 370/331 |
| 2011/0021154 A1* | 1/2011 | Marinier | H04W 56/001 455/67.11 |
| 2011/0201333 A1 | 8/2011 | Kwon et al. | |
| 2012/0063302 A1 | 3/2012 | Damnjanovic et al. | |
| 2012/0088498 A1* | 4/2012 | Xiao | H04W 24/02 455/424 |
| 2012/0113844 A1* | 5/2012 | Krishnamurthy | H04W 24/02 370/252 |
| 2012/0282934 A1 | 11/2012 | Simonsson et al. | |
| 2013/0102309 A1 | 4/2013 | Chande et al. | |
| 2013/0157680 A1 | 6/2013 | Morita et al. | |
| 2013/0223416 A1 | 8/2013 | Michel | |
| 2013/0294307 A1* | 11/2013 | Johansson | H04W 52/0216 370/311 |
| 2014/0050135 A1* | 2/2014 | Zhang | H04W 52/0206 370/311 |
| 2014/0064187 A1 | 3/2014 | Yokoyama | |
| 2015/0078264 A1 | 3/2015 | Han et al. | |
| 2015/0092566 A1 | 4/2015 | Balachandran et al. | |
| 2015/0117233 A1 | 4/2015 | Wong et al. | |
| 2015/0271763 A1 | 9/2015 | Balachandran et al. | |
| 2016/0316491 A1 | 10/2016 | Axmon | |
| 2018/0359631 A1 | 12/2018 | Balachandran et al. | |
| 2019/0124602 A1 | 4/2019 | Balachandran et al. | |

FOREIGN PATENT DOCUMENTS

| | | |
|---|---|---|
| RU | 2358396 C2 | 6/2009 |
| WO | 2012093888 A2 | 7/2012 |
| WO | 2012173565 A1 | 12/2012 |
| WO | 2014077765 A1 | 5/2014 |
| WO | 2015012654 A1 | 1/2015 |
| WO | 2015116732 A1 | 6/2015 |

OTHER PUBLICATIONS

Author Unknown, "Technical Specification Group Radio Access Network; Evolved Universal Terrestial Radio Access (E-UTRA); Requirements for support of radio resource management (Release 8)," Technical Specification 36.133, Version 8.19.0, 3GPP Organizational Partners, Sep. 2012, 338 pages.

Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.

Author Unknown, Technical Specification Group Radio Access Network; Evolved Universal Terrestrial Radio Access (E-UTRA); Radio Resource Control (RRC); Protocol specification (Release 8), Technical Specification 36.331, Version 8.17.0, 3GPP Organizational Partners, Jun. 2012, 215 pages.

Author Unknown, "Technical Specification Group Radio Access Network; Radio Resource Control (RRC); Protocol Specification (Release 12)," Technical Specification 25.331, Version 12.5.0, 3GPP Organizational Partners, Mar. 2015, 2225 pages.

Author Unknown, "Technical Specification Group Radio Access Network; Study on provision of low-cost MTC Ues based on LTE; (Release 11)," Technical Report 36.888, Version 2.0.0, 3GPP Organizational Partners, Jun. 2012, 43 pages.

Author Unknown, "Technical Specification Group Services and System Aspects; Service requirements for Machine-Type Communications (MTC); Stage 1 (Release 11)," Technical Specification 22.368, Version 11.6.0, 3GPP Organizational Partners, Sep. 2012, 21 pages.

Ericsson et al., "R1-124887: General considerations on coverage enhancements for MTC," 3rd Generation Partnership Project (3GPP), TSG-RAN WG1 #71, Nov. 12-16, 2012, 6 pages, New Orleans, USA.

Ericsson et al., "R1-124888: Required functionality for coverage enhancements for MTC," 3rd Generation Partnership Project (3GPP), TSG-RAN WG1 #71, Nov. 12-16, 2012, 4 pages, New Orleans, USA.

Ericsson, "R4-151491: Impact on RACH in enhanced coverage for MTC," 3rd Generation Partnership Project (3GPP), TSG RAN WG4 Meeting #74bis, Apr. 20-24, 2015, 4 pages, Rio de Janeiro, Brazil.

(56) References Cited

OTHER PUBLICATIONS

Ericsson, "Tdoc R2-150456: Random access procedure for low complexity and coverage enhanced UEs," 3rd Generation Partnership Project (3GPP), TSG-RAN WG2 #89, Feb. 9-13, 2015, 7 pages, Athens, Greece.
ETRI, "R1-150520: Feedback enhancements for high-order MU-MIMO," 3rd Generation Partnership Project (3GPP), TSG RAN WG1 Meeting #80, Feb. 9-13, 2015, 7 pages, Athens, Greece.
Huawei, et al., "R1-140026: Considerations on PRACH repetition levels and power adjustment of PRACH," 3rd Generation Partnership Project (3GPP), TSG RAN WG1 Meeting #76, Feb. 10-14, 2014, 6 pages, Prague, Czech Republic.
Nec, "R2-151420: RAR for Rel-13 low-complexity UE and UE in enhanced coverage," 3rd Generation Partnership Project (3GPP), TSG RAN2 Meeting #89bis, Apr. 20-24, 2015, 3 pages, Bratislava, Slovakia.
RAN1, "R1-150920: LS on PRACH coverage enhancement," 3rd Generation Partnership Project (3GPP), TSG RAN WG1 Meeting #80, Feb. 9-13, 2015, 2 pages, Athens, Greece.
RAN1, "R2-151008: LS on PRACH coverage enhancement," 3rd Generation Partnership Project (3GPP), TSG RAN WG2 Meeting #89bis, Apr. 20-24, 2015, 1 page, Bratislava, Slovakia.
Sharp, "R2-150148: Consideration on coverage enhanced RACH for Rel-13 MTC UEs," 3rd Generation Partnership Project (3GPP), TSG RAN WG2 Meeting #89, Feb. 9-13, 2015, 4 pages, Athens, Greece.
Vodafone, "RP-121441: Updated SID on: Provision of low-cost MTC UEs based on LTE," 3rd Generation Partnership Project (3GPP), TSG-RAN #57, Sep. 4-7, 2012, 6 pages, Chicago, USA.
Non-Final Office Action for U.S. Appl. No. 14/441,479, dated Oct. 7, 2016, 27 pages.
Final Office Action for U.S. Appl. No. 14/441,479, dated Apr. 18, 2017, 29 pages.
Non-Final Office Action for U.S. Appl. No. 14/441,479, dated Oct. 6, 2017, 26 pages.
Final Office Action for U.S. Appl. No. 14/441,479, dated May 11, 2018, 25 pages.
Advisory Action and Examiner-Initiated Interview Summary for U.S. Appl. No. 14/441,479, dated Aug. 7, 2018, 5 pages.
Notice of Allowance and Examiner-Initiated Interview Summary for U.S. Appl. No. 14/441,479, dated Sep. 5, 2018, 15 pages.
Non-Final Office Action for U.S. Appl. No. 14/390,649, dated Jul. 15, 2016, 22 pages.
Final Office Action for U.S. Appl. No. 14/390,649, dated Dec. 16, 2016, 8 pages.
Advisory Action and Examiner-Initiated Interview Summary for U.S. Appl. No. 14/390,649, dated Apr. 10, 2017, 4 pages.
Non-Final Office Action for U.S. Appl. No. 14/390,649, dated Jul. 26, 2017, 22 pages.
Notice of Allowance for U.S. Appl. No. 14/390,649, dated Feb. 8, 2018, 7 pages.
Notice of Allowance for U.S. Appl. No. 14/390,649, dated May 18, 2018, 8 pages.
Extended European Search Report for European Patent Application No. 17164602.9, dated Jul. 25, 2017, 9 pages.
International Search Report and Written Opinion for International Patent Application No. PCT/SE2013/051335, dated Feb. 12, 2014, 10 pages.
Non-Final Office Action for U.S. Appl. No. 16/104,552, dated Nov. 1, 2018, 22 pages.
Non-Final Office Action for U.S. Appl. No. 15/134,861, dated Apr. 11, 2018, 6 pages.
Notice of Allowance for U.S. Appl. No. 15/134,861, dated Jul. 13, 2018, 9 pages.
Substantive Examination for Russian Patent Application No. 2015122640/07, dated May 5, 2016, 12 pages.
International Search Report for PCT/SE2013/051334, dated Apr. 24, 2014, 3 pages.
The First Office Action for Chinese Patent Application No. 201680024790.4, dated Aug. 3, 2018, 29 pages.
International Search Report and Written Opinion for PCT/EP2016/059218, dated Jul. 18, 2016, 15 pages.
Non-Final Office Action for U.S. Appl. No. 16/229,268, dated Jul. 11, 2019, 16 pages.
Corrected Notice of Allowability for U.S. Appl. No. 16/229,268, dated Dec. 16, 2019, 7 pages.
Final Office Action for U.S. Appl. No. 16/104,552, dated Jul. 23, 2019, 16 pages.
Advisory Action and Examiner-Initiated Interview Summary for U.S. Appl. No. 16/104,552, dated Oct. 25, 2019, 7 pages.
Non-Final Office Action for U.S. Appl. No. 16/104,552, dated Dec. 20, 2019, 15 pages.
Notice of Allowance for U.S. Appl. No. 16/104,552, dated Apr. 15, 2020, 8 pages.
Extended European Search Report for European Patent Application No. 19153143.3, dated May 20, 2019, 8 pages.
Examination Report for European Patent Application No. 13802130.8, dated Apr. 11, 2019, 4 pages.
Non-Final Office Action for U.S. Appl. No. 15/777,109, dated Jun. 23, 2021, 9 pages.
Extended European Search Report for European Patent Application No. 21157093.2, dated Jun. 4, 2021, 6 pages.

* cited by examiner

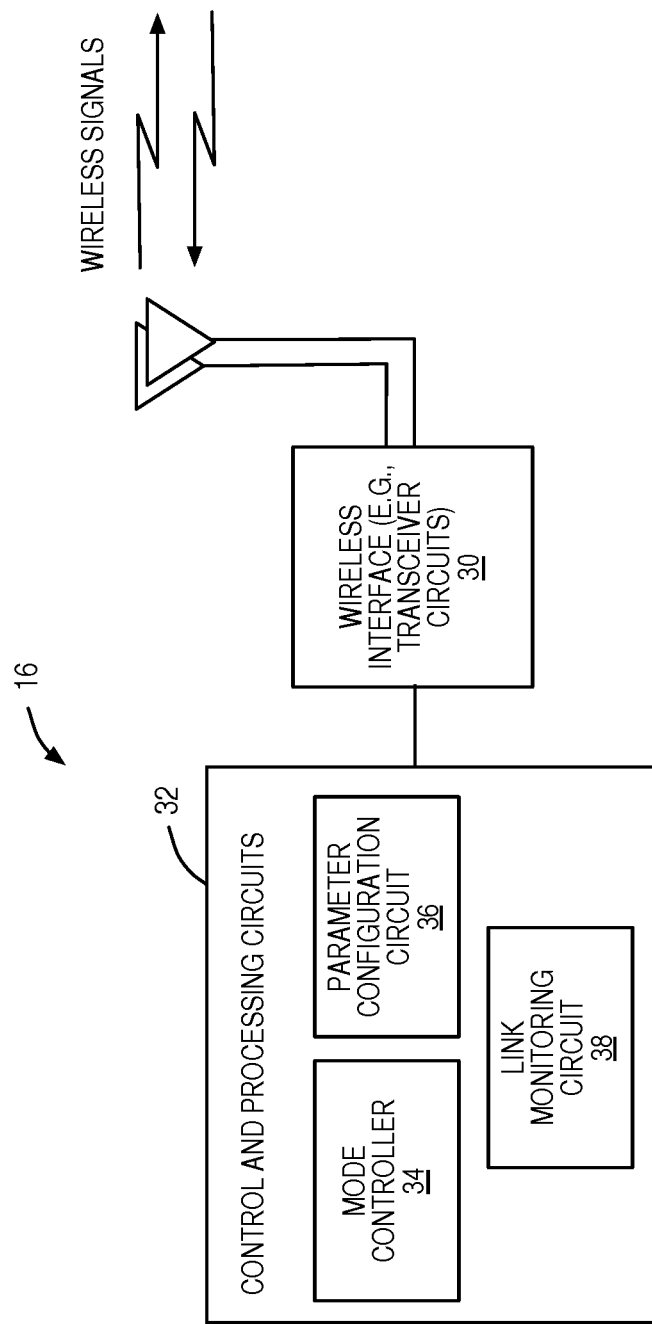

METHOD FOR MODIFYING PARAMETER VALUES FOR LONG RANGE EXTENSION AND CORRESPONDING NODE

RELATED APPLICATIONS

This application is a continuation of U.S. patent application Ser. No. 16/229,268, filed Dec. 21, 2018, which is a continuation of U.S. patent application Ser. No. 14/441,479, filed May 7, 2015, now U.S. Pat. No. 10,194,402, which is a 35 U.S.C. § 371 national phase filing of International Application No. PCT/SE2013/051335, filed Nov. 13, 2013, which claims the benefit of provisional patent application Ser. No. 61/725,921, filed Nov. 13, 2012, the disclosures of which are hereby incorporated herein by reference in their entirety.

FIELD OF THE DISCLOSURE

The present disclosure relates to a cellular communications network and more particularly relates to long range extension in a cellular communications network.

BACKGROUND

There is an increasing need to support efficient and cost-effective devices, or terminals, in a cellular communications network. This is especially true with the increasing interest in and development of Machine-to-Machine (M2M) communication. In the 3rd Generation Partnership Project (3GPP) standards, unlike traditional services such as voice and web streaming, M2M services often have very different requirements on the cellular communications network due to specific features of M2M services specified in 3GPP Technical Specification (TS) 22.368 v.11.6.0, "Service requirements for Machine-Type Communications (MTC); Stage 1." Another distinguishing characteristic in a cellular communications network with M2M communication is the large increase in the number of Machine Type Communication (MTC) devices. Both the different requirements of M2M services and the large number of MTC devices bring forth new challenges to develop a cost, spectrum, and energy efficient radio access technology for M2M applications and MTC devices in a cellular communications network.

In M2M communications, the MTC devices (e.g., smart meters, signboards, cameras, remote sensors, laptops, and appliances) are connected to the cellular communications network. Most of the MTC devices transmit sporadically one or only a few short packets containing measurements, reports, and triggers, e.g., temperature, humidity, wind speed, etc. In most cases, the MTC devices are expected to be static or to have low mobility. A common understanding of MTC devices is that the MTC devices should be of low complexity targeting low-end (low average revenue per user, low data rate, high latency tolerance) applications. The power/energy consumption of the MTC devices is expected to be low as well.

Several factors affect the cost for both manufacturing and operating a given wireless device. The main manufacturing cost drivers are: (1) processing speed (mainly at reception), (2) number of antennas, and (3) bandwidth. Therefore, 3GPP Radio Access Network (RAN) Work Group 1 (i.e., RAN1) has studied Long Term Evolution (LTE) User Equipment (UE) modem cost reduction techniques for provisioning of low-cost MTC UEs based on LTE. The results of the study are documented in 3GPP Technical Report (TR) 36.888 V2.0.0 (3GPP Tdoc RP-120714), "Study on provision of low-cost Machine-Type Communications (MTC) User Equipments (UEs) based on LTE." Since then, an updated Study Item Description (SID) (3GPP Tdoc RP-121441, "Study on Provision of low-cost MTC UEs based on LTE") has been approved which extends the scope of the study to also include study of coverage enhancements. More specifically, the updated SID states that:

A 20 dB improvement in coverage in comparison to defined LTE cell coverage footprint engineered for "normal LTE UEs" should be targeted for low-cost MTC UEs, using very low rate traffic with relaxed latency (e.g. size of the order of 100 bytes/message in UL and 20 bytes/message in DL, and allowing latency of up to 10 seconds for DL and up to 1 hour in uplink, i.e. not voice). In identifying solutions, any other related work agreed for Release 12 should be taken into account.

This new requirement on enhanced coverage for very low rate traffic with relaxed latency in accordance with the updated SID should be added to the list of requirements on the low-cost MTC UE specified in 3GPP TR 36.888 section 5.1, which are:

Support data rates equivalent to that supported by R'99 EGPRS with an EGPRS multi-slot class 2 device (2 downlink timeslots (118.4 Kilobits per second (Kbps)), 1 uplink timeslot (59.2 Kbps), and a maximum of 3 active timeslots) as a minimum. This does not preclude the support of higher data rates provided the cost targets are not compromised.

Enable significantly improved average spectrum efficiency for low data rate MTC traffic compared to that achieved for R99 Global System for Mobile Communications (GSM)/EGPRS terminals in GSM/EGPRS networks today, and ideally comparable with that of LTE. Optimizations for low-cost MTC UEs should minimize impact on the spectrum efficiency achievable for other terminals (normal LTE terminals) in LTE Release 8-10 networks.

Ensure that the service coverage footprint of low cost MTC UE based on LTE is not any worse than the service coverage footprint of a GSM/EGPRS MTC device (in a GSM/EGPRS network) or that of "normal LTE UEs" (in an LTE network) assuming they are on the same spectrum band.

Ensure that overall power consumption is no worse than existing GSM/General Packet Radio Service (GPRS) based MTC devices.

Ensure good radio frequency coexistence with legacy (Release 8-10) LTE radio interface and networks.

Target operation of low-cost MTC UEs and legacy LTE UEs on the same carrier.

Re-use the existing LTE/System Architecture Evolution (SAE) network architecture.

Solutions should be specified in terms of changes to the Release 10 version of the LTE specifications.

The study item shall consider optimizations for both Frequency Division Duplexing (FDD) and Time Division Duplexing (TDD) mode.

The initial phase of the study shall focus on solutions that do not necessarily require changes to the LTE base station hardware.

Low cost MTC devices support limited mobility (i.e., no support of seamless handover or ability to operate in networks in different countries) and are low-power consumption modules.

Thus, systems and methods for not only meeting the aforementioned requirements for MTC communication and MTC devices but also for optimizing MTC communication and the operation of MTC devices in a long range extension mode of operation required to satisfy the aforementioned coverage enhancement are desired.

SUMMARY

The present disclosure relates to adjusting Radio Link Monitoring (RLM), Radio Link Failure (RLF) detection, RLF recovery, and/or connection establishment failure detection for wireless devices in a cellular communications network depending on mode of operation. In one embodiment, a node in the cellular communications network determines whether a wireless device is to operate in a long range extension mode of operation or a normal mode of operation. The node then applies different values for at least one parameter depending on whether the wireless device is to operate in the long range extension mode or the normal mode. The at least one parameter is at least one of: one or more RLM parameters, one or more RLF detection parameters, and one or more RLF recovery parameters. In doing so, signaling overhead and energy consumption within the wireless device when operating in the long range extension mode is substantially reduced. In one embodiment, the wireless device is a Machine Type Communication (MTC) device.

In one embodiment, the cellular communications network is a Long Term Evolution (LTE) cellular communications network, and the at least one parameter includes at least one of a group consisting of: Qin, Qout, T301, T310, T311, N310, N311, T304, and T300. Qin, Qout, T301, T310, T311, N310, N311, T304, and T300 are parameters used for RLM, RLF detection, RLF recovery, and connection establishment failure detection in LTE.

In one embodiment, the at least one parameter includes at least one RLM parameter. In one embodiment, the at least one RLM parameter includes a threshold measurement for generating an in-sync indication for the wireless device and/or a threshold measurement for generating an out-of-sync indication for the wireless device. In one particular embodiment, the cellular communications network is an LTE cellular communications network, and the at least one RLM parameter includes Qin and/or Qout. Qin and Qout are quality measures (e.g., Signal-to-Interference-and-Noise Ratio (SINR) values) that represent, for example, the ability to receive control signaling at specific Block Error Rates (BLERs). In one embodiment, the cellular communications network is an LTE cellular communications network, the at least one RLM parameter includes Qin, and a modified value for Qin for the long range extension mode corresponds to a BLER for the Physical Downlink Control Channel (PDCCH), or a new control channel, that is greater than a BLER for the PDDCH that corresponds to a normal value of Qin for the normal mode. In one embodiment, the cellular communications network is an LTE cellular communications network, the at least one RLM parameter includes Qin, and a modified value for Qin for the long range extension mode corresponds to a BLER that is often greater than 2%. In another embodiment, the cellular communications network is an LTE cellular communications network, the at least one RLM parameter includes Qout, and a modified value for Qin for the long range extension mode corresponds to a BLER that is greater than a BLER that corresponds to a normal value of Qout for the normal mode. In another embodiment, the cellular communications network is an LTE cellular communications network, the at least one RLM parameter includes Qout, and a modified value for Qout for the long range extension mode corresponds to a BLER that is greater than 10%.

In one embodiment, the at least one parameter includes at least one RLF detection parameter. In one embodiment, the at least one RLF detection parameter includes a counter indicative of a maximum number of consecutive out-of-sync indications before triggering a timer for an RLF detection. In one embodiment, the cellular communications network is an LTE cellular communications network, the at least one RLF detection parameter includes N310, and a modified value for N310 for the long range extension mode is greater than a normal value for N310 for the normal mode. In one embodiment, the cellular communications network is an LTE cellular communications network, the at least one RLF detection parameter includes N310, and a modified value for N310 for the long range extension mode is greater than 20.

In another embodiment, the at least one RLF detection parameter includes a timer for detecting a radio link failure triggered in response to a pre-configured maximum number of consecutive out-of-sync indications for the wireless device. In one embodiment, the cellular communications network is an LTE cellular communications network, the at least one RLF detection parameter includes T310, and a modified value for T310 for the long range extension mode is greater than a normal value for T310 for the normal mode. In one embodiment, the cellular communications network is an LTE cellular communications network, the at least one RLF detection parameter includes T310, and a modified value for T310 for the long range extension mode is greater than 2,000 milliseconds (ms).

In one embodiment, the at least one parameter includes at least one RLF recovery parameter. In one embodiment, the at least one RLF recovery parameter includes a timer for detecting failure of a cell selection attempt after detecting a radio link failure. In one embodiment, the cellular communications network is an LTE cellular communications network, the at least one RLF recovery parameter includes T311, and a modified value for T311 for the long range extension mode is greater than a normal value for T311 for the normal mode. In one embodiment, the cellular communications network is an LTE cellular communications network, the at least one RLF recovery parameter includes T311, and a modified value for T311 for the long range extension mode is greater than 30,000 ms.

In another embodiment, the at least one RLF recovery parameter includes a timer for detecting failure of a radio link re-establishment attempt after detecting a radio link failure. In one embodiment, the cellular communications network is an LTE cellular communications network, the at least one RLF recovery parameter includes T301, and a modified value for T301 for the long range extension mode is greater than a normal value for T301 for the normal mode. In one embodiment, the cellular communications network is an LTE cellular communications network, the at least one RLF recovery parameter includes T301, and a modified value for T301 for the long range extension mode is greater than 2,000 ms.

In one embodiment, the at least one parameter includes at least one RLF recovery parameter utilized for RLF recovery after a handover failure. In one embodiment, the at least one RLF recovery parameter includes a timer for detecting failure of a radio link re-establishment attempt after detecting a radio link failure during handover. In one embodiment, the cellular communications network is an LTE cellular communications network, the at least one RLF recovery parameter includes T304, and a modified value for T304 for the long range extension mode is greater than a normal value for T304 for the normal mode. In one embodiment, the cellular communications network is an LTE cellular communications network, the at least one RLF recovery parameter includes T304, and a modified value for T304 for the long range extension mode is greater than 8,000 ms.

In one embodiment, the at least one parameter includes at least one connection establishment failure detection parameter utilized by the wireless device to detect a failed connection establishment. In one embodiment, the at least one connection establishment failure detection parameter includes a timer for detecting a failed connection establishment. In one embodiment, the cellular communications network is an LTE cellular communications network, the at least one connection establishment failure detection parameter includes T300, and a modified value for T300 for the long range extension mode is greater than a normal value for T300 for the normal mode. In one embodiment, the cellular communications network is an LTE cellular communications network, the at least one connection establishment failure detection parameter includes T300, and a modified value for T300 for the long range extension mode is greater than 8,000 ms.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a cellular communications network according to one embodiment of the present disclosure;

FIGS. 2A and 2B illustrate the operation of one of the wireless devices of FIG. 1 to perform Radio Link Monitoring (RLM), Radio Link Failure (RLF) detection, and RLF recovery based on a number of parameters (i.e., timers and/or counters) that are configured with different values depending on whether the wireless device is operating in a long range extension mode or a normal mode according to one embodiment of the present disclosure;

Figure 14:
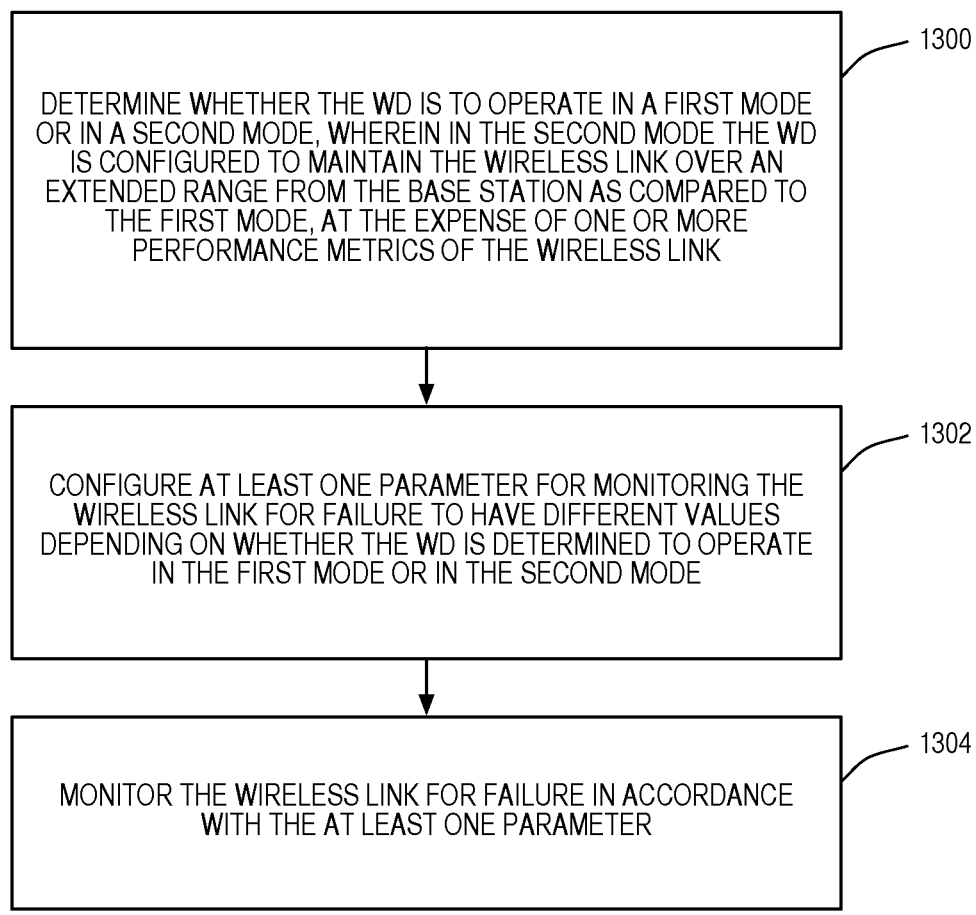
Figure 15:
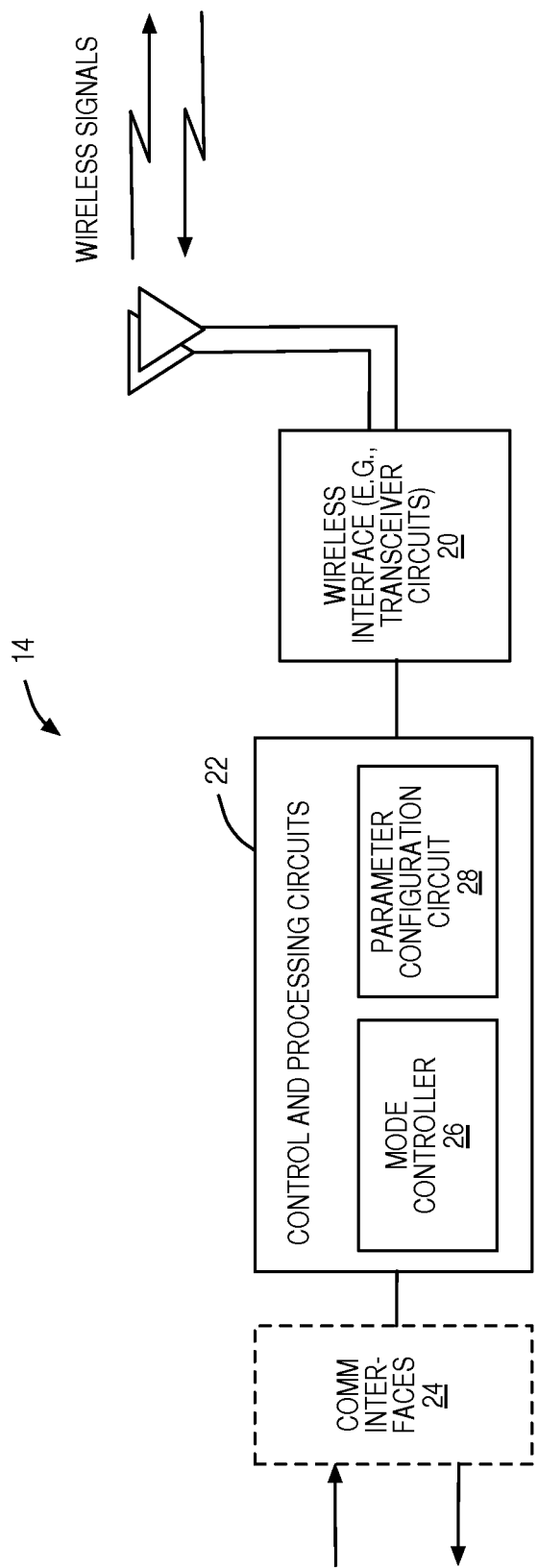

FIG. 14 illustrates a process by which a node determines whether a wireless device is to operate in either a first mode or a second mode and to configure one or more parameters for monitoring a wireless link of the wireless device for failure with different values depending on whether the wireless device is to operate in either the first mode or the second mode according to one embodiment of the present disclosure;

FIG. 15 is a block diagram of a base station according to one embodiment of the present disclosure; and FIG. 16 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
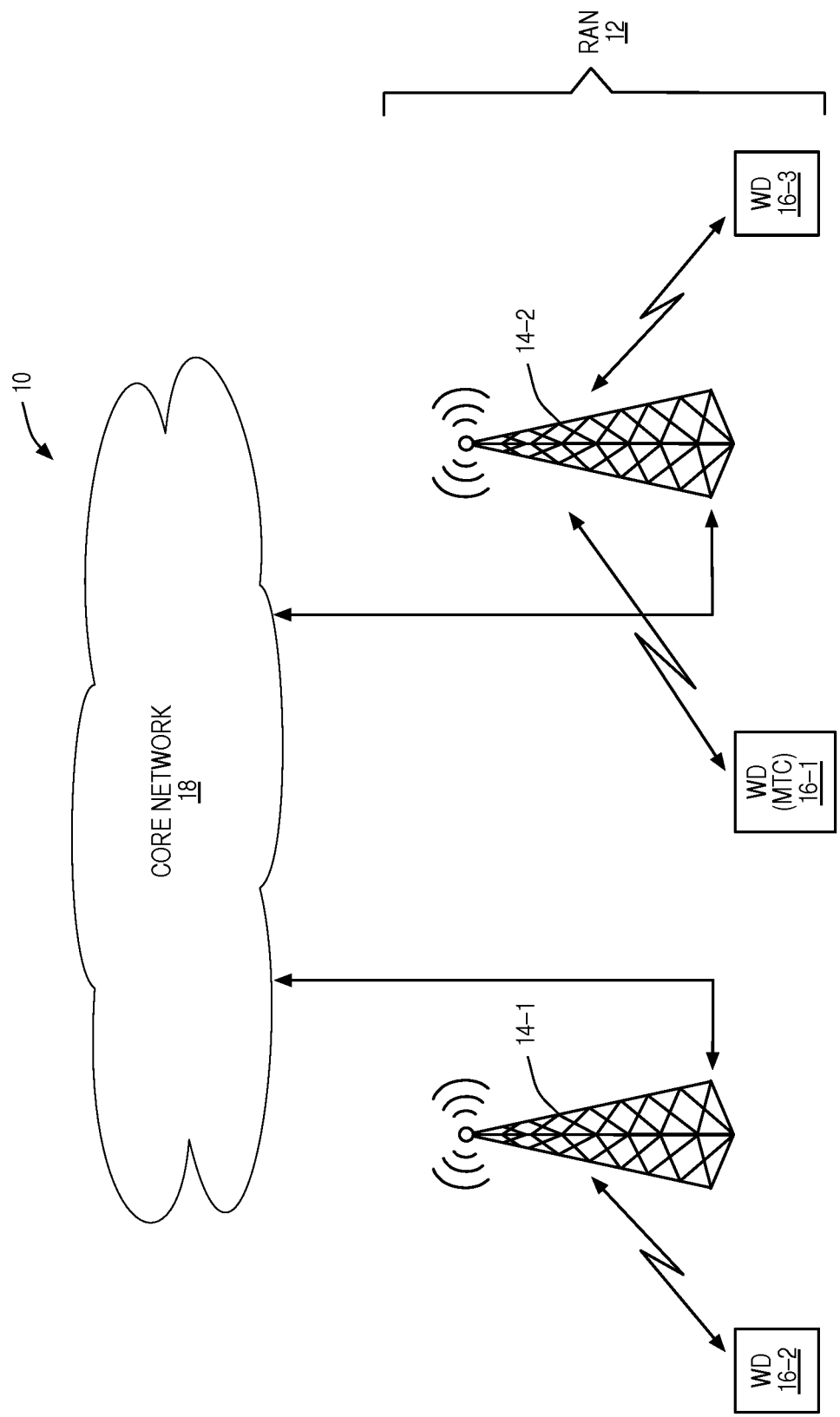

Systems and methods for adjusting Radio Link Monitoring (RLM), Radio Link Failure (RLF) detection, RLF recovery, and/or connection establishment failure detection for wireless devices in a cellular communications network that are operating in a long range extension mode of operation are disclosed. In this regard, FIG. 1 illustrates a cellular communications network 10 according to one embodiment of the present disclosure. Notably, in many of the embodiments described herein, the cellular communications network 10 is a Long Term Evolution (LTE) (i.e., LTE or LTE-Advanced) cellular communications network. As such, LTE terminology is oftentimes used throughout this disclosure. However, the concepts and embodiments disclosed herein are not limited to LTE, and may be utilized in any suitable type of cellular or wireless network.

As illustrated, the cellular communications network 10 includes a Radio Access Network (RAN) 12 including a number of base stations 14. The base stations 14 provide wireless access to wireless devices 16 within coverage areas (e.g., cells) of the base stations 14. The base stations 14 are connected to a core network 18. In LTE terminology, the wireless devices 16 are referred to as User Equipments (UEs), and the base stations 14 are referred to as Evolved, or Enhanced, Node Bs (eNBs). While in this embodiment the base stations 14 are macro base stations, the RAN 12 may include a mixture of macro base stations and lower power base stations (i.e., pico base stations, femto base stations, Home eNBs, etc.). At least some of the wireless devices 16 are Machine Type Communication (MTC) devices and perform Machine-to-Machine (M2M) communication. Some examples of MTC devices are smart meters, signboards, cameras, remote sensors, laptops, and appliances.

The wireless devices 16, or at least the wireless devices 16 that are capable of M2M communication (i.e., the MTC devices), are configured to operate in either a normal mode of operation or a long range extension mode of operation. In one embodiment, the normal mode and the long range extension mode are two different modes (i.e., a first mode and a second mode), where, in the long range extension mode, the wireless device 16 is configured to maintain communication (i.e., uplink and/or downlink) with the cellular communications network 10 (via one of the base stations 14) over an extended range as compared to that in the normal mode. This extended range is a range beyond which communication between the wireless device 16 and a corresponding base station 14 would normally be difficult or impossible. In one embodiment, a wireless device 16 operates in the long range extension mode when a radio propagation path between the wireless device 16 and a nearest base station 14 (in terms of radio distance, e.g., highest received signal strength, highest Reference Signal Received Power (RSRP), highest Reference Signal Received Quality (RSRQ), or the like) is worse than a predefined threshold degree. In one particular embodiment, a wireless device 16 operates in the long range extension mode when a path loss for a propagation path between the wireless device 16 and a nearest base station 14 (in terms of radio distance, e.g., highest received signal strength, highest RSRP, highest RSRQ, or the like) exceeds the typical path loss value of N Decibels (dB) in the cellular communications network 10 for a typical inter-site distance in the order of hundreds of meters.

In order to enable the long range extension mode of operation, one or more range extension mechanisms are utilized by the cellular communications network 10 (e.g., by the base stations 14) and/or the wireless devices 16 that are capable of operating in the long range extension mode (e.g., those wireless devices 16 that are MTC devices or are capable of M2M communication). A wireless device 16 is configured to operate in the long range extension mode (specific to that wireless device 16) if the one or more range extension mechanisms are activated with respect to the wireless device 16. Otherwise, the wireless device 16 is configured to operate in the normal mode of operation. The one or more range extension mechanisms increase a maximum acceptable propagation loss while still maintaining the radio link (uplink and/or downlink) between the wireless device 16 and the cellular communications network 10 (specifically the RAN 12), which thereby enables communication within a long range extension mode of the RAN 12. The range extension mechanisms that are utilized to provide the long range extension mode include, e.g., increased transmit power at the wireless device 16 and/or base station(s) 14 (e.g., the nearest base station 14), increased amount of reference signal resources in the uplink and/or downlink, modified repetition schemes in the uplink and/or downlink, scheduling restrictions in the uplink and/or downlink, different coding and modulation schemes in the uplink and/or downlink, synchronization signals that are more likely to be detected by the wireless device 16 when operating in the long range extension mode, use of random access resources that improve probability of being detected by the RAN 12, or the like.

One issue that arises with respect to wireless devices 16 operating in the long range extension mode is that conventional RLM, RLF detection, RLF recovery, and connection establishment failure detection mechanisms will result in a significant amount of signaling overhead and power consumption at those wireless devices 16. More specifically, conventional, or normal, RLM, RLF detection, RLF recovery, and connection establishment failure detection mechanisms are designed for wireless devices experiencing normal radio conditions, i.e., wireless devices located in benign locations which are subject to channel variations due to movement. However, these conventional mechanisms are not always optimal for wireless devices 16 that are operating in the long range extension mode such as, for example, wireless devices 16 that are stationary and located in locations that result in challenging radio propagation conditions (e.g., MTC devices located in very bad coverage spots such as, for example, electricity meters installed in basements that periodically report electricity measurements). For these types of wireless devices 16, the conventional mechanisms for RLM, RLF detection, RLF recovery, and connection establishment failure detection may generate excessive signaling overhead, frequent RLF events, and frequent RLF recovery attempts, all of which would result in high levels of power consumption.

As discussed in detail below, one or more of the embodiments disclosed herein can be utilized to provide efficient RLM, RLF detection, RLF recovery, and connection establishment failure detection for wireless devices 16 experiencing challenging radio propagation conditions such as those wireless devices 16 that are operating in the long range extension mode of operation. This ensures that these wireless devices 16 can operate with as good radio performance and energy efficiency as possible. Before proceeding, it should be noted that the problems given above should not be construed as limiting the scope of the concepts or embodiments disclosed herein.

More particularly, one or more of the embodiments disclosed herein can be utilized to provide an overall solution for RLM, RLF detection (i.e., RLF triggering), RLF recovery, and connection establishment failure detection for the wireless devices 16 operating in the long range extension mode and, more specifically, a long range extension mode requiring long range coverage extension features for very low rate traffic with relaxed latency, such as those being studied by $3^{rd}$ Generation Partnership Project (3GPP) as described in 3GPP Tdoc RP-121441, "Study on Provision of low-cost MTC UEs based on LTE." While embodiments disclosed herein or implementations of the embodiments disclosed herein may be used to address the problem above, the embodiments disclosed herein may be utilized in manners that do not necessarily address the problem above.

As discussed below in detail, one or more embodiments disclosed herein involve:

Reduction of radio link measurements (e.g. out-of-sync indication) for the wireless devices 16 operating in the long range extension mode, Setting Qin and Qout (or equivalently, the hypothetical Block Error Rate (BLER) in the Physical Downlink Control Channel (PDCCH) taking into account Physical Control Format Indicator Channel (PCFICH) errors with specified transmission parameters) appropriately for the wireless devices 16 operating in the long range extension mode, possibly to new values not currently supported within existing 3GPP specifications, without generating unnecessary RLF triggers. The current values supported by existing 3GPP specifications are specified in 3GPP Technical Specification (TS) 36.133 V8.19.0, "Evolved Universal Terrestrial Radio Access (E-UTRA); Requirements for support of radio resource management;" 3GPP TS 36.213 V8.8.0, "Evolved Universal Terrestrial Radio Access (E-UTRA); Physical layer procedures;" and 3GPP TS 36.331 V8.17.0, "Evolved Universal Terrestrial Radio Access (E-UTRA); Radio Resource Control (RRC) Protocol specification."

Setting RLF triggering (i.e., RLF detection) and RLF recovery timers and counters such as T301, T304, T310, T311, N310, and T300 appropriately for the wireless devices 16 operating in the long range extension mode, possibly to new values not currently supported within existing 3GPP specifications. The currently supported values for these timers and counters are defined in 3GPP TS 36.331 V8.17.0, "Evolved Universal Terrestrial Radio Access (E-UTRA); Radio Resource Control (RRC) Protocol specification."

In one embodiment, the values of parameter(s) used for RLM, RLF detection, RLF recovery, and connection establishment failure detection are set according to a subscription class of the wireless devices 16. Thus, the adjusted values for the RLM, RLF detection, RLF recovery, and/or connection establishment failure detection parameter(s) for the long range extension mode may be predefined (statically or pre-configured by the cellular communications network 10) for a specific subscription class that is used for the wireless devices 16 operating in the long range extension mode. Alternatively, the values for the parameter(s) can be signaled by the cellular communications network 10 in case the cellular communications network 10 detects the need for a wireless device 16 to operate in the long range extension mode.

Figure 2A:
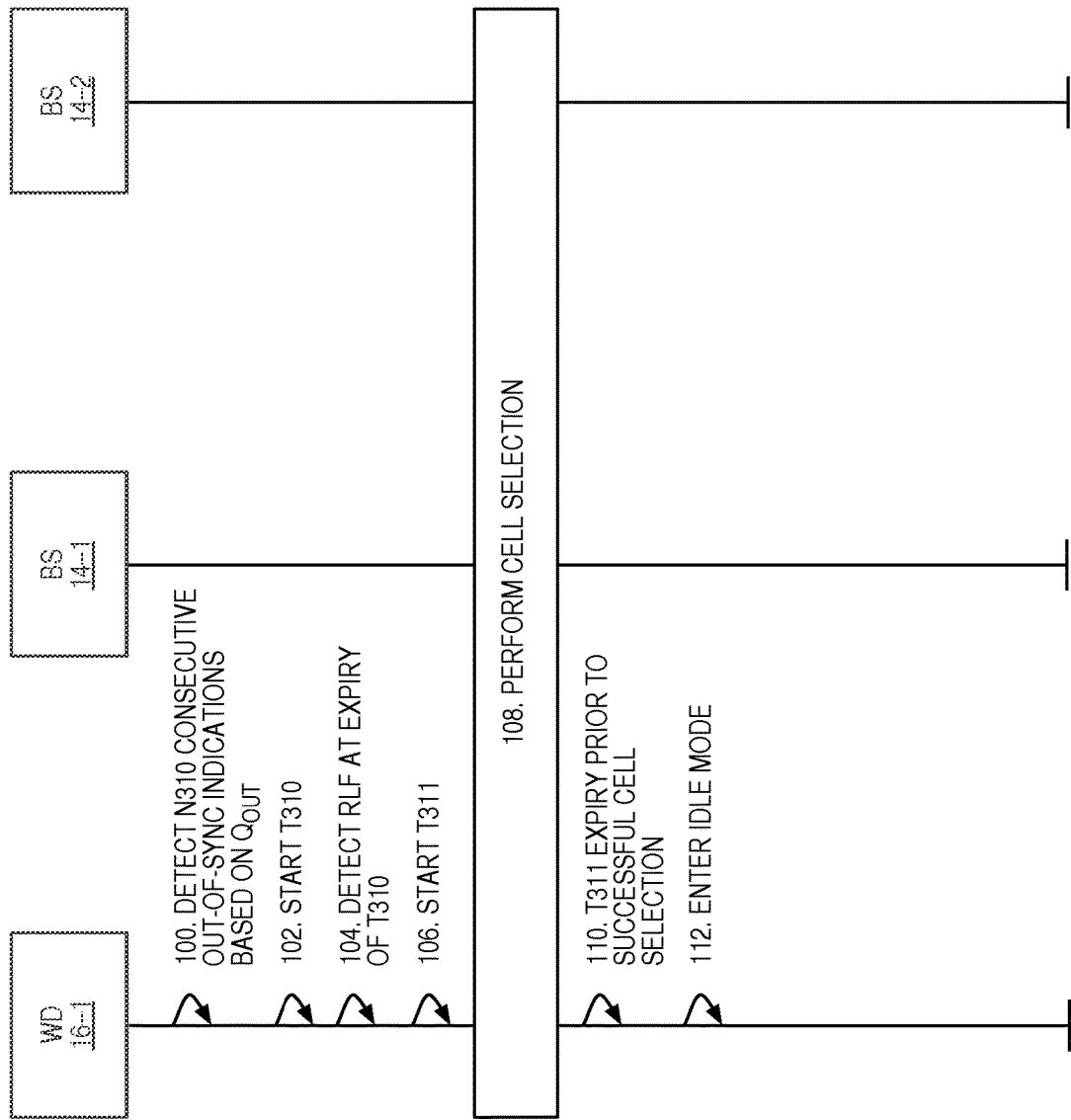
Figure 2B:
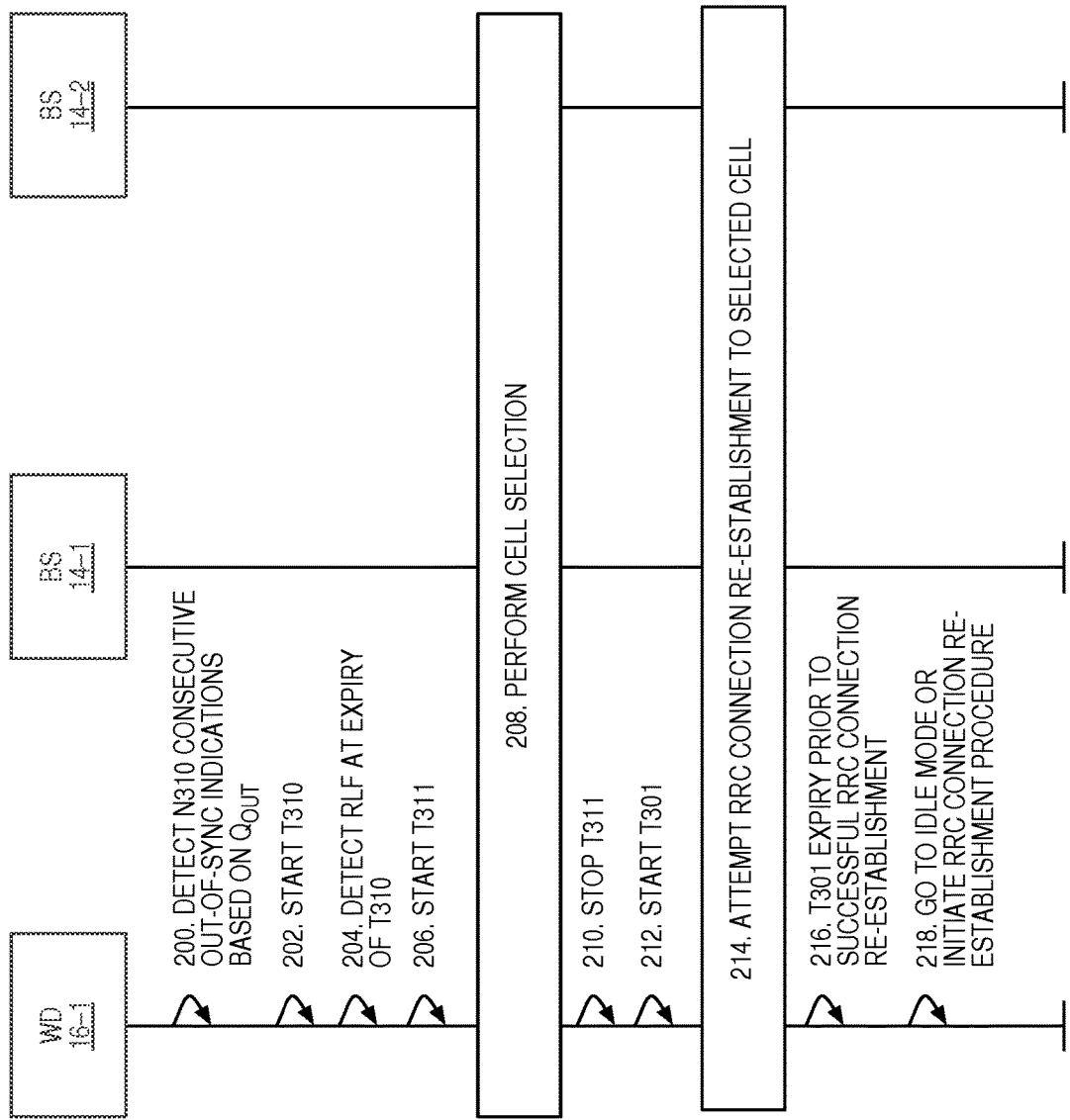

FIGS. 2A and 2B illustrate RLM, RLF detection, and RLF recovery according to one embodiment of the present disclosure. FIGS. 2A and 2B use the wireless device 16-1 as an example since the wireless device 16-1 is an MTC device. However, this discussion is also applicable to the other wireless devices 16. As illustrated, the wireless device 16-1 detects a number, N310, of consecutive out-of-sync indications based on an out-of-sync threshold Qout (step 100). More specifically, the wireless device 16-1 generates an estimate of a downlink quality for a downlink from the base station 14-1 to the wireless device 16-1 and compares the estimate to the out-of-sync threshold Qout. In LTE, Qout represents a link quality that would result in a BLER of a hypothetical PDCCH transmission from the base station 14-1 to the wireless device 16-1 equal to a specific value. Further, the conventional value for Qout this BLER is 10%. If the estimate of the downlink quality corresponds to a BLER of greater than 10%, then the wireless device 16-1 generates an out-of-sync indication. Each time the wireless device 16-1 generates an out-of-sync indication, a counter V310 is incremented. Using the counter V310, the wireless device 16-1 is able to detect a number, N310, of consecutive out-of-sync indications i.e., N310 consecutive out-of-sync indications without any in-sync indications where the estimated downlink quality is better than Qin, which represents a link quality that would result in a BLER for the PDCCH that is equal to a specific value. This specific value for the BLER for the PDCCH for Qin is conventionally 2%.

In response to detecting N310 consecutive out-of-sync indications, the wireless device 16-1 starts a timer T310 (step 102). At the expiry of the timer T310, the wireless device 16-1 detects an RLF (step 104). Note that an RLF failure will not be detected if a number, N311, of consecutive in-sync indications are generated before the expiry of the timer T310. At the moment the RLF is detected in step 104, the wireless device 16-1 performs an RLF recovery procedure. Specifically, the wireless device 16-1 starts a timer T311 (step 106) and performs a cell selection procedure (step 108). In this example, the timer T311 expires prior to successful cell selection (step 110). As such, RLF recovery has failed, and the wireless device 16-1 enters IDLE mode (step 112).

FIG. 2B is similar to that of FIG. 2A but where cell selection is successful. More specifically, the wireless device 16-1 detects a number, N310, of consecutive out-of-sync indications based on an out-of-sync threshold Qout, as discussed above (step 200). In response to detecting N310 consecutive out-of-sync indications, the wireless device 16-1 starts a timer T310 (step 202). At the expiry of the timer T310, the wireless device 16-1 detects an RLF (step 204). Note that an RLF failure will not be detected if a number, N311, of consecutive in-sync indications are generated before the expiry of the timer T310. At the moment the RLF is detected in step 204, the wireless device 16-1 performs an RLF recovery procedure. Specifically, the wireless device 16-1 starts a timer T311 (step 206) and performs a cell search or cell selection procedure (step 208). In this example, cell selection successfully completes prior to the expiry of the timer T311 and, as such, the wireless device 16-1 stops the timer T311 (step 210) and triggers an RRC connection re-establishment procedure. In the RRC connection re-establishment procedure, the wireless device 16-1 starts a timer T301 (step 212) and attempts RRC connection re-establishment to the selected cell (step 214). In this example, the timer T301 expires prior to successful RRC connection re-establishment (step 216). As such, RRC connection re-establishment and thus RLF recovery has failed. The wireless device 16-1 then enters IDLE mode or initiates an RRC connection re-establishment procedure (step 218).

The processes of FIGS. 2A and 2B use a number of parameters. Specifically, the processes use RLM parameters Qout (and, while not shown, Qin), N310, and N311; RLF detection parameter T310; and RLF recovery parameters T311 and T301. As discussed below, in one embodiment, one or more of these parameters are configured with different values depending on whether the wireless device 16-1 is in the long range extension mode or the normal mode. In the normal mode, the parameters are set to conventional values as specified in the current LTE standards. Conversely, in the long range extension mode, one or more of the parameters are set to modified values that are more suitable for the long range extension mode (e.g., are more relaxed).

Figure 3:
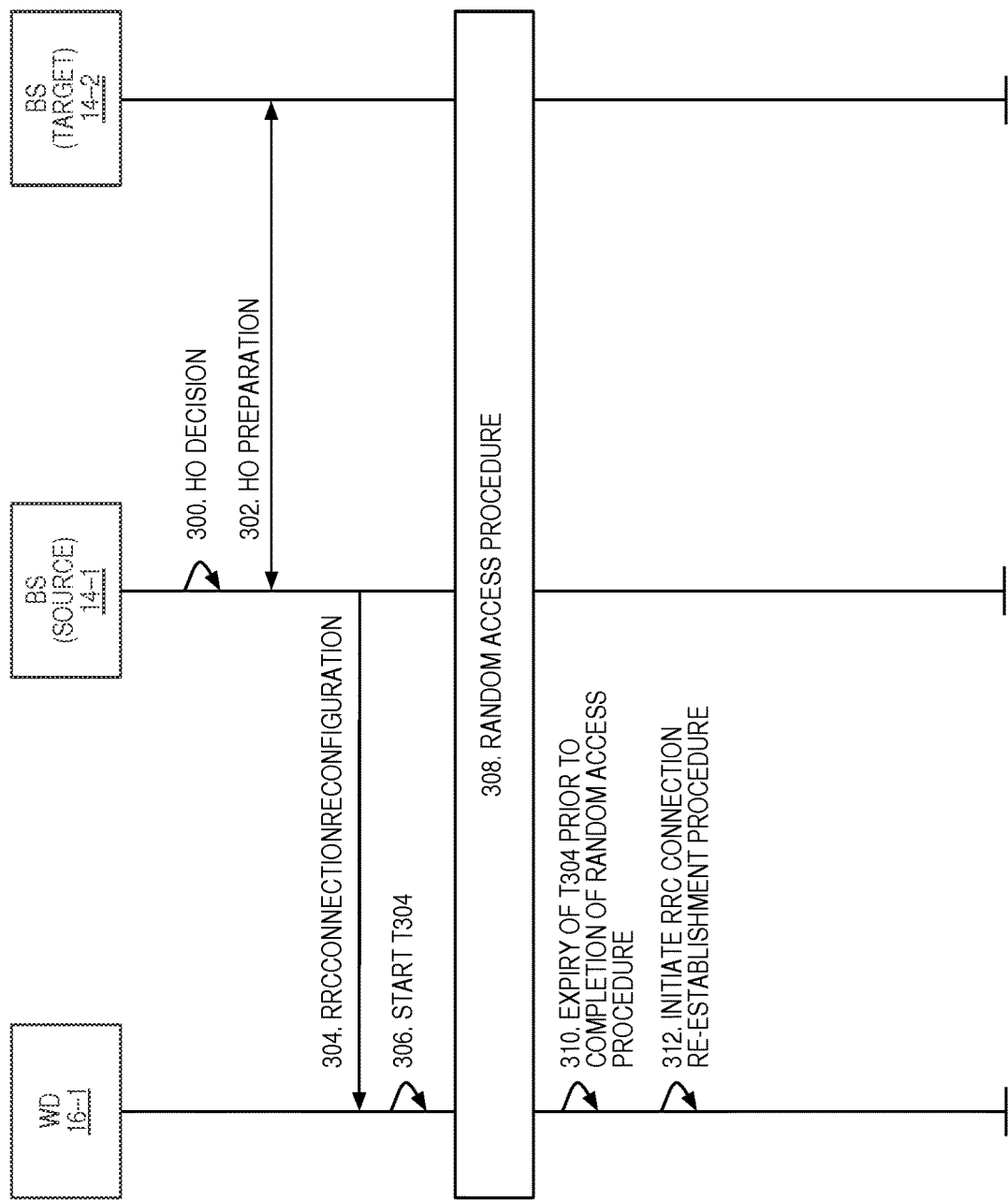
FIG. 3 illustrates the operation of one of the wireless devices of FIG. 1 to perform RLF detection and recovery with respect to a handover based on a number of parameters (i.e., timer(s)) that are configured with different values depending on whether the wireless device is operating in a long range extension mode or a normal mode according to one embodiment of the present disclosure.

FIG. 3 illustrates the operation of the wireless device 16-1 of FIG. 1 to perform RLF detection and recovery with respect to a handover according to one embodiment of the present disclosure. FIG. 3 uses the wireless device 16-1 as an example since the wireless device 16-1 is an MTC device. However, this discussion is also applicable to the other wireless devices 16. As illustrated, the base station 14-1, which in this example is a source base station for the handover process, decides that a handover is to be performed for the wireless device 16-1 (step 300). The base station 14-1 communicates with the base station 14-2, which in this example is a target base station for the handover, to prepare for the handover (step 302). The base station 14-1 sends an RRCConnectionReconfiguration message to the wireless device 16-1 that instructs the wireless device 16-1 to perform the handover (step 304).

In response, the wireless device 16-1 starts a timer T304 (step 306) and performs a random access procedure to attempt random access for the base station 14-2 (step 308). In this example, the timer T304 expires prior to completion of the random access procedure (i.e., prior to successful random access) (step 310). The expiry of the timer T304 corresponds to a handover failure. In response, the wireless device 16-1 initiates an RRC connection re-establishment procedure in order to attempt to re-establish an RRC connection (step 312).

The process of FIG. 3 uses a number of parameters. Specifically, the process uses an RLF parameter T304. As discussed below, in one embodiment, the timer T304 is configured with different values depending on whether the wireless device 16-1 is in the long range extension mode or the normal mode. In the normal mode, the timer T304 is set to a conventional value as specified in the current LTE standards. Conversely, in the long range extension mode, the timer T304 is set to a modified value that is more suitable for the long range extension mode (e.g., a more relaxed, or larger, value).

Figure 4:
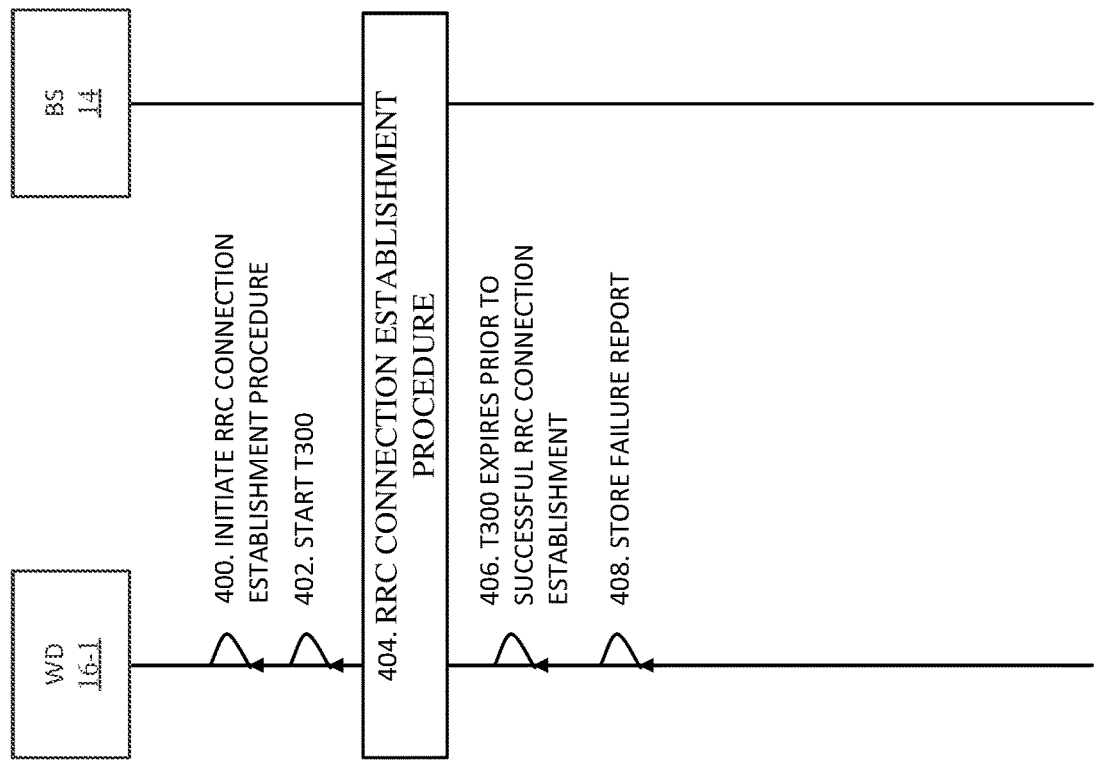
FIG. 4 illustrates the operation of one of the wireless devices of FIG. 1 to detect a connection failure based on a number of parameters (i.e., timer(s)) that are configured with different values depending on whether the wireless device is operating in a long range extension mode or a normal mode according to one embodiment of the present disclosure.

FIG. 4 illustrates the operation of the wireless device 16-1 of FIG. 1 to detect a connection establishment failure according to one embodiment of the present disclosure. FIG. 4 uses the wireless device 16-1 as an example since the wireless device 16-1 is an MTC device. However, this discussion is also applicable to the other wireless devices 16. As illustrated, the wireless device 16-1 initiates an RRC connection establishment procedure (step 400). The wireless device 16-1 starts a timer T300 and performs an RRC connection establishment procedure to attempt to establish an RRC connection with the base station 14 (step 404). In this example, the timer T300 expires prior to successful RRC connection establishment (step 406). The wireless device 16-1 stores a corresponding failure report, which can subsequently be reported (step 408).

Like the processes of FIGS. 2A and 2B and FIG. 3, the process of FIG. 4 uses a number of parameters. Specifically, the process uses a connection establishment failure detection parameter, which is also referred to herein as an RLF associated parameter, T300. As discussed below, in one embodiment, the timer T300 is configured with different values depending on whether the wireless device 16-1 is in the long range extension mode or the normal mode. In the normal mode, the timer T300 is set to a conventional value as specified in the current LTE standards. Conversely, in the long range extension mode, the timer T300 is set to a modified value that is more suitable for the long range extension mode (e.g., a more relaxed, or larger, value).

Figure 5:
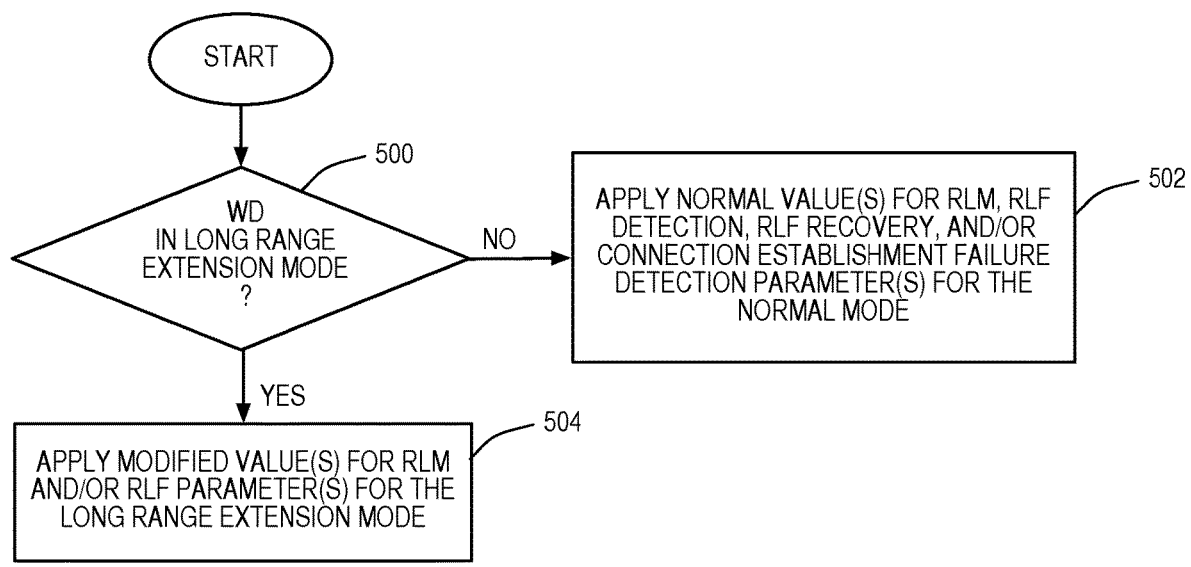
FIG. 5 illustrates a process by which a node determines whether a wireless device is to operate in a long range extension mode or a normal mode and applies different values to one or more parameters utilized by the wireless device for RLM, RLF detection, RLF recovery, and/or connection establishment failure detection according to one embodiment of the present disclosure.

While FIGS. 2A and 2B, FIG. 3, and FIG. 4 illustrate some specific examples of RLM, RLF detection, RLF recovery, and connection establishment failure detection processes, FIGS. 5 through 13 relate to determining whether a wireless device 16 is to operate in the long range extension mode or the normal mode and applying the appropriate values for one or more parameters for RLM, RLF detection, RLF recovery, and/or connection establishment failure detection based on the determined mode of operation for the wireless device 16. In this regard, FIG. 5 illustrates a process by which a node determines whether a wireless device 16 is to operate in the long range extension mode or the normal mode and applies different values to one or more parameters utilized by the wireless device 16 for RLM, RLF detection, RLF recovery, and/or connection establishment failure detection according to one embodiment of the present disclosure. Preferably, the node that performs the process of FIG. 5 is the wireless device 16, which can be any kind of device. However, the process of FIG. 5 may alternatively be performed by another node, e.g., a network node such as, for example, a radio network node (i.e., a node in the RAN 12 such as, for example, one of the base stations 14) or a core network node (i.e., a node in the core network 18 such as, for example, a Mobility Management Entity (MME)). Further, in one particular embodiment, the process of FIG. 5 is performed by the wireless device 16 while in an active RRC connection or an active radio link session. In another particular embodiment, the process of FIG. 5 is performed by the wireless device 16 when in an active RRC mode or in a mode of inactive radio link connection, or equivalently termed "idle" mode.

As illustrated, the node first determines whether the wireless device 16 is to be in the long range extension mode (step 500). Notably, the determination of step 500 may be made whether or not the wireless device 16 is already operating in the long range extension mode (e.g., it may be desired to check if the wireless device 16 is to be in the long range extension mode, e.g., periodically or each time there is a need for the wireless device 16 to communicate with the cellular communications network 10). Embodiments of how the node makes the determination in step 500 are discussed below. However, the determination is not limited to the embodiments discussed below. As one example, in one or more embodiments, the decision on whether the wireless device 16 is to operate in the long range extension mode or the normal mode is made based on an extent to which communication between the wireless device 16 and the RAN 12 (in the downlink, uplink, or both) proves difficult. Some examples of the conditions, parameters, and thresholds that are indicative of the degree of difficulty, or difficulty level, of maintaining communication are described below. While not essential, for further examples, the interested reader is directed to U.S. Provisional Patent Application Ser. No. 61/725,951, filed Nov. 13, 2012, entitled "Specific Long Range Extension Mode Triggering," further patented as U.S. Pat. No. 10,097,990, issued Oct. 9, 2018, the disclosures of which are incorporated herein by reference in their entireties.

If the wireless device 16 is not to be in the long range extension mode (i.e., is to be in the normal mode), the node applies normal value(s) for one or more RLM, RLF detection, RLF recovery, and/or connection establishment failure detection parameters for the normal mode of operation (step 502). If the wireless device 16 is to be in the long range extension mode, the node applies modified values(s) for one or more RLM, RLF detection, RLF recovery, and/or connection establishment failure detection parameters for the long range extension mode (step 504).

More specifically, in one embodiment, the node performing the process is the wireless device 16, and the wireless device 16 applies the modified value(s) by first modifying the values for the one or more RLM, RLF detection, RLF recovery, and/or connection establishment failure detection parameters from their normal values to the modified value(s) for the long range extension mode and then applies the parameter(s) having the modified value(s) for RLM, RLF detection, RLF recovery, and/or connection establishment failure detection. Note that the modified values may be statically defined (e.g., defined by a new version of the LTE standards for the long range extension mode) or configured by the cellular communications network 10. The wireless device 16 then utilizes the RLM, RLF detection, RLF recovery, and/or connection establishment failure detection parameter(s) having the modified value(s) for the long range extension mode of operation for RLM, RLF detection, RLF recovery, and/or connection establishment failure detection.

In another embodiment, the node performing the process is a network node (e.g., a serving base station 14 of the wireless device 16). In this case, the network node applies the modified value(s) for the RLM, RLF detection, RLF recovery, and/or connection establishment failure detection parameter(s) by instructing the wireless device 16 to operate in the long range extension mode of operation. In one particular embodiment, the modified values are predefined (e.g., statically) and stored by the wireless device 16 such that the wireless device 16 can then configure the RLM, RLF detection, RLF recovery, and/or connection establishment failure detection parameter(s) with the modified values for the long range extension mode. In another particular embodiment, the modified value(s) are configured by the cellular communications network 10 and, for example, included in the request sent to the wireless device 16 to operate in the long range extension mode of operation. The wireless device 16 then utilizes the RLM, RLF detection, RLF recovery, and/or connection establishment failure detection parameter(s) having the modified value(s) for the long range extension mode of operation for RLM, RLF detection, RLF recovery, and/or connection establishment failure detection.

With regards to LTE, parameter(s) that are configured with different values depending on whether the wireless device 16 operates in the long range extension mode or the normal mode may include, for example, one or more of: Qin (and/or a corresponding BLER), Qout (and/or a corresponding BLER), N310, T310, T311, T301, T304, T300, and RLM frequency. The parameters Qin and Qout are defined, at least for the normal mode, in 3GPP TS 36.133, Section 7.6.1. Specifically, the threshold Qin is defined as "the level at which the downlink radio link quality can be significantly more reliably received than at Qout and shall correspond to 2% block error rate of a hypothetical PDCCH transmission taking into account the PCFICH errors with transmission parameters specified in Table 7.6.1-2." The transmission parameters specified in Table 7.6.1-2 are, e.g., a Downlink Control Indication (DCI) format of 1C, a number of control OFDM symbols of either 2, 3, or 4, an aggregation level (CCE) of 4, etc. The threshold Qout is defined as "the level at which the downlink radio link cannot be reliably received and shall correspond to 10% block error rate of a hypothetical PDCCH transmission taking into account the PCFICH errors with transmission parameters specified in Table 7.6.1-1." The transmission parameters specified in Table 7.6.1-1 are, e.g., a DCI format of 1A, a number of control OFDM symbols of either 2, 3, or 4, an Aggregation level (CCE) of either 4 or 8, etc.

In a similar manner, the parameters N310, T310, N311, T311, T301, T304, T300 are defined in the current LTE standards, at least for the normal mode, as indicated in Tables 1, 2, 3, 4, and 5 below.

TABLE 1

As defined in 3GPP 36.331

| Timer | Start | Stop | At expiry |
|---|---|---|---|
| T300 | Transmission of RRC CONNECTION REQUEST | Reception of RRC CONNECTION SETUP or RRC CONNECTION REJECT message, cell re-selection, and upon abortion of connection establishment by upper layers | Perform the actions as specified in 3GPP TS 36.331 section 5.3.3.6 |
| T304 | Reception of RRC CONNECTION RECONFIGURATION message including the MOBILITY CONTROL Info or reception of MOBILITY FROM E-UTRA COMMAND message including CELL CHANGE ORDER | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; in case of handover to E-UTRA, perform the actions defined in the specifications applicable for the source RAT |
| T310 | Upon detecting physical layer problems, i.e., upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT | Enter RRC_IDLE |

TABLE 2

As defined in 3GPP 25.331

| Timer | Start | Stop | At expiry |
|---|---|---|---|
| T300 | Transmission of RRC CONNECTION REQUEST | Reception of RRC CONNECTION SETUP | Re-transmit RRC CONNECTION REQUEST if V300 = <N300, else go to Idle mode |
| T304 | Transmission of UE CAPABILITY INFORMATION | Reception of UE CAPABILITY INFORMATION CONFIRM | Re-transmit UE CAPABILITY INFORMATION if V304 = <N304, else initiate a cell update procedure |

TABLE 2-continued

As defined in 3GPP 25.331

| Timer | Start | Stop | At expiry |
|---|---|---|---|
| T310 | Transmission of PUSCH CAPACITY REQUEST | Reception of PHYSICAL SHARED CHANNEL ALLOCATION | Transmit PUSCH CAPACITY REQUEST if V310 = <N310, else procedure stops |
| T311 | Reception of PHYSICAL SHARED CHANNEL ALLOCATION message with the CHOICE "PUSCH allocation" set to "PUSCH allocation ending" | Reception of PHYSICAL SHARED CHANNEL ALLOCATION message with CHOICE = "PUSCH allocation" set to "PUSCH allocation assignment" | UE may initiate a PUSCH capacity request procedure |

TABLE 3

As defined in 3GPP 25.331

| Counter | Reset | Incremented | When reaching max value |
|---|---|---|---|
| V300 | When initiating the procedure RRC connection establishment | Upon expiry of T300 | When V300 > N300, the UE enters idle mode |
| V304 | When sending the first UE CAPABILITY INFORMATION message | Upon expiry of T304 | When V304 > N304 the UE initiates the Cell update procedure |
| V310 | When sending the first PUSCH CAPACITY REQUEST message in a PUSCH capacity request procedure | Upon expiry of T310 | When V310 > N310 the UE stops re-transmitting the PUSCH CAPACITY REQUEST message |

TABLE 4

As defined in 3GPP 36.331

| Constant | Usage |
|---|---|
| N310 | Maximum number of consecutive "out-of-sync" indications received from lower layers |
| N311 | Maximum number of consecutive "in-sync" indications received from lower layers |

TABLE 5

As defined in 3GPP 25.331

| Constant | Usage |
|---|---|
| N310 | Maximum number of re-transmission of the PUSCH CAPACITY REQUEST message |

Notably, as indicated in the tables above, some of the parameters are used for different purposes according to different parts of the LTE specifications. For example, in addition to being used to detect a failure of RRC connection re-establishment after a handover as described above with respect to FIG. 3, the timer T304 is used with respect to the transmission of UE capability information. If the wireless device 16 does not receive a UE capability information confirm message before the expiry of T304, the wireless device 16 re-transmits the UE capability information up to the maximum number of re-transmissions (N304). Thus, for parameters such as the timer T304 that relate to re-transmission of information or messages by the wireless device 16, the relaxing of the values for the parameters (e.g., increasing timers or counters) can reduce the number of re-transmissions and/or corresponding failures at the wireless device 16 when operating in the long range extension mode.

As used herein, the "normal values" for the parameters Qin, Qout, N310, T310, T311, N311, T301, T304, T300, and RLM frequency are values specified in the current LTE standards (i.e., LTE standards published prior to Nov. 13, 2012). In this regard, typical values for these parameters are:
Qin: A Signal-to-Interference-and-Noise Ratio (SINR) value (typically −4 dB) that corresponds to a 2% BLER for the PDCCH,
Qout: A SINR value (typically −8 dB) that corresponds to a 10% BLER for the PDCCH,
N310: A value in the range of 0 to 20,
T310: A value in the range of 0 to 2,000 milliseconds (ms),
N311: A value in the range of 1 to 10,
T311: A value in the range of 0 to 30,000 ms,
T301: A value in the range of 0 to 2,000 ms,
T304: A value in the range of 0 to 8,000 ms,
T300: A value from the set of values: 400 ms, 600 ms, 800 ms, 1,000 ms, 1,200 ms, 1,400 ms, 1,600 ms, 1,800 ms, 2,000 ms, 3,000 ms, 4,000 ms, 6,000 ms, and 8,000 ms, and
RLM frequency: Every Transmission Time Interval (TTI). Conversely, as used herein, the "modified values" for the parameters Qin, Qout, N310, T310, T311, T301, T304, T300, and RLM frequency for the long range extension mode are, or at least possibly include, values that are not specified in the current LTE standards. In this regard, the modified values for these parameters are, for example:
Qin:
In one embodiment, the modified value for Qin is a SINR value that is less than the SINR value for the Qin for the normal mode. The lower SINR value corresponds to a higher BLER for the PDCCH for the long range extension mode than the BLER for the PDCCH for the normal mode (i.e., a BLER for the PDCCH for the long range extension mode that is greater than 2%). For example, the modified value for Qin may be a SINR value that corresponds to N % BLER for PDCCH where N is a targeted probability for receiving PDCCH correctly within 1 TTI when operating in the long range extension mode and may be set by the cellular communications network. In one particular embodiment, Qin for the long range extension mode is a SINR value less than −4 dB (which usually corresponds to a BLER that is greater than 2%). In another embodiment, Qin for the long range extension mode is a SINR value that is less than −4 dB and greater than or equal to −15 dB (but greater than Qout).
In another embodiment, the modified value for Qin is a SINR that corresponds to a 2% BLER of a new control channel for the long range extension mode. The new control channel is desired to work in the long range extension mode. As an example, the new control channel may be provided by repeating the normal PDCCH X times (X>1).

In yet another embodiment, the modified value for Qin may be a SINR value that is less than the SINR value for the Qin for the normal mode and corresponds to a modified BLER value of a new control channel, e.g., a new control channel provided as the normal control channel with a repetition factor greater than one.

Qout:
  In one embodiment, the modified value for Qout is a SINR value that is less than the SINR value for the Qout for the normal mode. The lower SINR value corresponds to a higher BLER for the PDCCH for the long range extension mode than the BLER for the PDCCH for the normal mode (i.e., a BLER for the PDCCH that is greater than 10%). For example, the modified value for Qout may be a SINR value that corresponds to M % BLER for PDCCH where M is a targeted probability for receiving PDCCH correctly within 1 TTI when operating in the long range extension mode and may be set by the cellular communications network. In one particular embodiment, Qout for the long range extension mode is a SINR value less than −8 dB (which usually corresponds to a BLER that is greater than 10%). In another embodiment, Qout for the long range extension mode is a SINR value that is less than −8 dB and greater than or equal to −20 dB (but less than the SINR value for Qin for the long range extension mode).

In another embodiment, the modified value for Qout is a SINR that corresponds to a 10% BLER of a new control channel for the long range extension mode. The new control channel is desired to work in the long range extension mode. As an example, the new control channel may be provided by repeating the normal PDCCH X times (X>1).

In yet another embodiment, the modified value for Qout may be a SINR value that is less than the SINR value for the Qout for the normal mode and corresponds to a modified BLER value of a new control channel, e.g., a new control channel provided as the normal control channel with a repetition factor greater than one.

N310:
  In one embodiment, the modified value for N310 for the long range extension mode is a value in the range of 0 to 100. In another embodiment, the modified value for N310 for the long range extension mode is a value greater than 20. In yet another embodiment, the modified value for N310 for the long range extension mode is a value in the range of greater than 20 and less than or equal to 100.

T310:
  In one embodiment, the modified value for T310 for the long range extension mode is a value in the range of 0 to 100,000 ms. In another embodiment, the modified value for T310 for the long range extension mode is a value greater than 2,000 ms. In yet another embodiment, the modified value for T310 for the long range extension mode is a value in the range of greater than 2,000 ms and less than or equal to 100,000 ms.

N311:
  In one embodiment, the modified value for N311 for the long range extension mode is a value in the range of 0 to 100. In another embodiment, the modified value for N311 for the long range extension mode is a value greater than 10. In yet another embodiment, the modified value for N311 for the long range extension mode is a value in the range of greater than 10 and less than or equal to 100.

T311:
  In one embodiment, the modified value for T311 for the long range extension mode is a value in the range of 0 to 100,000 ms. In another embodiment, the modified value for T311 for the long range extension mode is a value that is greater than 30,000 ms. In yet another embodiment, the modified value for T311 for the long range extension mode is a value in the range of greater than 30,000 ms and less than or equal to 100,000 ms.

T301:
  In one embodiment, the modified value for T301 for the long range extension mode is a value in the range of 0 to 100,000 ms. In another embodiment, the modified value for T301 for the long range extension mode is a value that is greater than 2,000 ms. In yet another embodiment, the modified value for T301 for the long range extension mode is a value in the range of greater than 2,000 ms and less than or equal to 100,000 ms.

T304:
  In one embodiment, the modified value for T304 for the long range extension mode is a value in the range of 0 to 100,000 ms. In another embodiment, the modified value for T304 for the long range extension mode is a value that is greater than 8,000 ms. In yet another embodiment, the modified value for T304 for the long range extension mode is a value that is in the range of greater than 8,000 ms and less than or equal to 100,000 ms.

T300:
  In one embodiment, the modified value for T300 for the long range extension mode is a value in the range of 400 to 100,000 ms. In another embodiment, the modified value for T300 for the long range extension mode is a value that is greater than 8,000 ms. In yet another embodiment, the modified value for T300 for the long range extension mode is a value that is in the range of greater than 8,000 ms and less than or equal to 100,000 ms.

RLM frequency:
  In one embodiment, the modified value for the RLM frequency is every R-th TTI, where R is greater than 1.

In one particular embodiment, the node applies the modified values listed above for the RLM parameters Qout, Qin, and N310 as well as the modified values for the RLF detection parameters T310 and T304 if the wireless device 16 is to be in the long range extension mode and applies the normal values listed above for the RLM parameters Qout, Qin, and N310 as well as the modified values for the RLF detection parameters T310 and T304 if the wireless device 16 is to be in the normal mode. Note that N311 may also be set to a different value depending on whether the wireless device 16 is to be in the long range extension mode or the normal mode. In another particular embodiment, the node applies the modified values listed above for the RLF recovery parameters T311 and T301 if the wireless device 16 is to be in the long range extension mode and applies the normal values listed above for the RLF recovery parameters T311 and T301 if the wireless device 16 is to be in the normal mode. In another particular embodiment, the node applies the modified value listed above for the parameter T300 if the wireless device 16 is to be in the long range extension mode and applies the normal value listed above for the RLM parameter T300 if the wireless device 16 is to be in the normal mode.

In another embodiment, in addition to or as an alternative to modifying value(s) for other RLM, RLF detection, RLF recovery, and/or connection establishment failure detection parameters, the RLM frequency is modified such that RLM is performed less frequently (i.e., the modified value for the RLM frequency corresponds to a lower RLF frequency than that for the normal mode). More specifically, for LTE, the RLF frequency for the long range extension mode is set to every R-th TTI, where R is greater than 1. As one example, the RLM frequency for the long range extension mode may be set such that the physical layer in the wireless device 16, in every R-th TTI where the radio link quality of the serving cell is assessed, indicates out-of-sync to higher layers when the radio link quality is worse than the threshold Qout. When the radio link quality is better than the threshold Qin, the physical layer indicates in-sync to higher layers in every R-th TTI where the radio link quality of the serving cell is assessed. In one scenario, the wireless device 16 monitors downlink quality in this way based on a cell-specific reference signal in order to detect the downlink radio quality of the serving cell.

Figure 6:
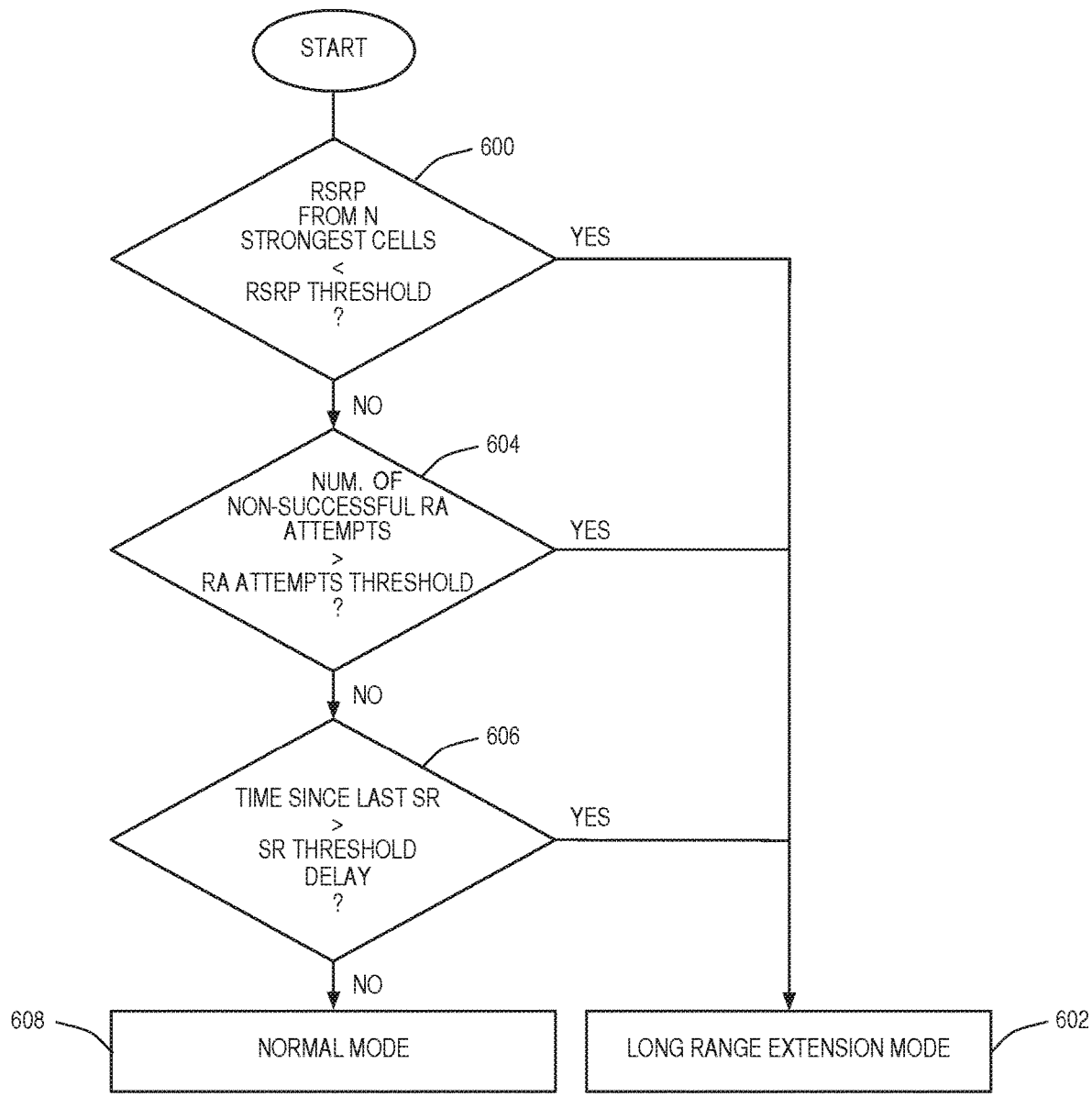
FIG. 6 illustrates a process by which a node determines whether a wireless device is to operate in a long range extension mode or a normal mode according to one embodiment of the present disclosure.

FIG. 6 illustrates a process by which a node determines whether a wireless device 16 is to operate in the long range extension mode or the normal mode according to one embodiment of the present disclosure. This process may be performed by a network node (e.g., a radio network node such as, for example, one of the base stations 14 or a core network node) or performed by the wireless device 16. Note that the ordering of the steps in FIG. 6 is not important. In other words, the various criteria may be checked in any desired order. Further, not all steps may be performed. Specifically, the determination of whether the wireless device 16 is to operate in the long range extension mode may be made based on any one or more of the criteria indicated in FIG. 6.

As illustrated, the node determines whether RSRP from a predefined (statically defined or configured by the cellular communications network 10) number, N, of strongest cells at the wireless device 16 are all less than a predefined (statically defined or configured by the cellular communications network 10) RSRP threshold (step 600). If so, the node determines that the wireless device 16 is to operate in the long range extension mode (step 602). At that point, the modified value(s) for the RLM, RLF detection, RLF recovery, and/or connection establishment failure detection parameter(s) are applied with respect to the wireless device 16, as discussed above. Otherwise, the node determines whether a number of non-successful Random Access (RA) attempts by the wireless device 16 is greater than a predefined RA attempts threshold (step 604). If so, the node determines that the wireless device 16 is to operate in the long range extension mode (step 602). At that point, the modified value(s) for the RLM, RLF detection, RLF recovery, and/or connection establishment failure detection parameter(s) are applied with respect to the wireless device 16, as discussed above. Otherwise, the node determines whether a time period elapsed since transmission of the last (current) scheduling request by the wireless device 16 is greater than a predefined scheduling request delay threshold (step 606). If so, the node determines that the wireless device 16 is to operate in the long range extension mode (step 602). At that point, the modified value(s) for the RLM, RLF detection, RLF recovery, and/or connection establishment failure detection parameter(s) are applied with respect to the wireless device 16, as discussed above. Otherwise, the node determines that the wireless device 16 is to operate in the normal mode (step 608).

In one example, values for the RSRP threshold, N, the RA attempts threshold, and scheduling request delay threshold are −120 Decibel-Milliwatt (dBm), 1, 10, and 100 ms, respectively. However, these are just examples. Other values may be used. Also, the value for the scheduling request delay threshold can be significantly higher than the value of a timer that is typically launched when a scheduling request is transmitted by the wireless device 16, which is typically in the order of 5-10 ms. Moreover, this period might correspond to more than one scheduling request.

It should be noted that RLM, RLF detection (i.e., RLF triggering), and RLF recovery are functions executed when the wireless device 16 is in the Radio Resource Control (RRC) connected mode. Therefore, the criteria of steps 600, 604, if it is assumed that the random access procedure is a part of the connected mode, and 606 are criteria for when the wireless device 16 is in connected mode. The criterion of step 600 can be replaced by measuring the RSRP from the serving cell.

While the process of FIG. 6 is not limited thereto, it may be used in association with the process of FIG. 5. For example, the process of FIG. 6 may be performed by the node performing the process of FIG. 5 with respect to step 500 of FIG. 5. As another example, the process of FIG. 6 may be performed by a node (e.g., a network node) other than the node performing the process of FIG. 5 and the resulting decision communicated to the node performing the process of FIG. 5 (e.g., via a request for the wireless device 16 to operate in the long range extension mode). Also, it should be noted that, in one embodiment, the wireless device 16 permanently or continuously performs the process of FIG. 6.

Figure 7:
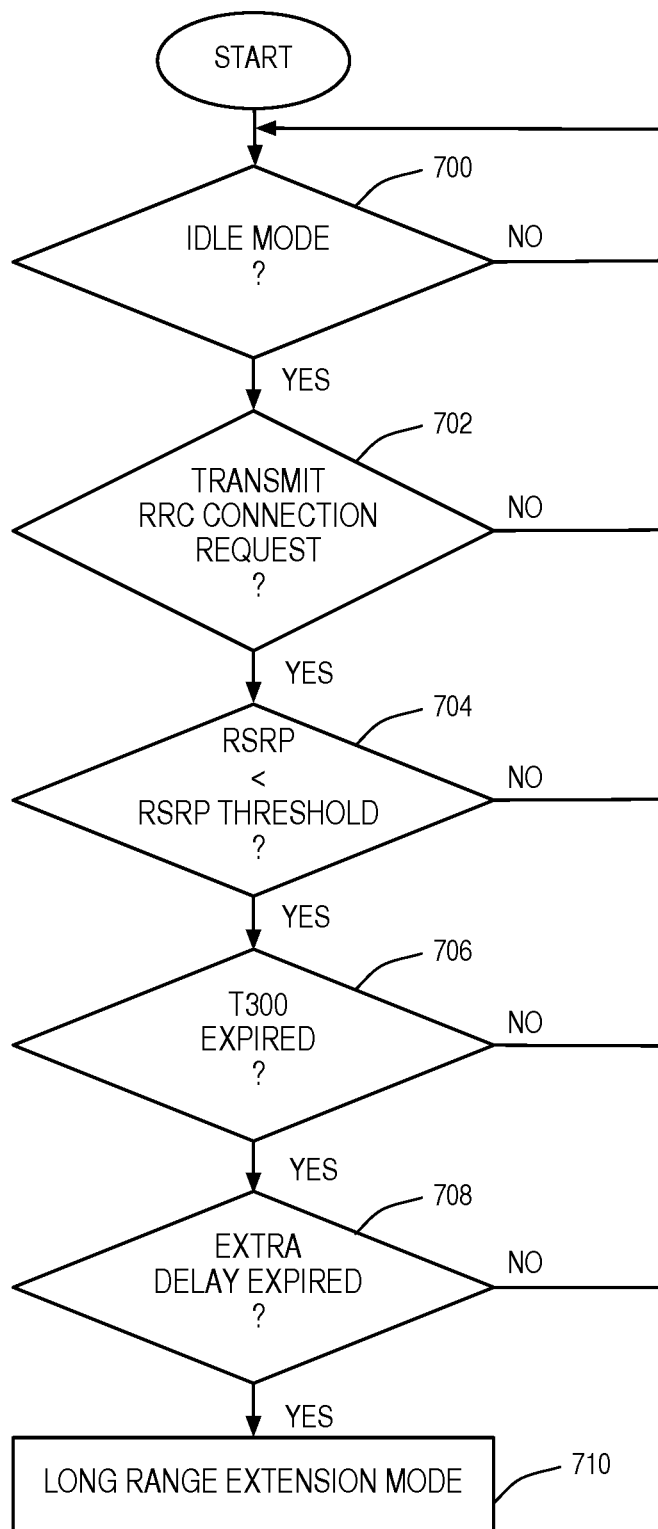
FIG. 7 illustrates a process by which a node triggers a process, or procedure, for determining whether a wireless device is to operate in a long range extension mode or a normal mode according to one embodiment of the present disclosure.

FIG. 7 illustrates a process by which a node determines whether a wireless device 16 is to operate in the long range extension mode or the normal mode according to one embodiment of the present disclosure. This process may be performed by a network node (e.g., a radio network node such as, for example, one of the base stations 14 or a core network node) or performed by the wireless device 16. However, in one preferred embodiment, the process of FIG. 7 is performed by the wireless device 16. Note that the ordering of the steps in FIG. 7 may vary from that which is illustrated. Further, not all steps may be performed. Notably, RLM may be performed by the wireless device 16 in both RRC idle and connected mode, although with different granularity and periodicity. The process of FIG. 7 may be used to determine when the wireless device 16 is to operate in the long range extension mode such that the modified values for one or more RLM parameters are applied, as discussed above.

As illustrated, the node determines whether the wireless device 16 is in idle mode (step 700). If not, the process returns to step 700. If the wireless device 16 is in idle mode, the node determines whether the wireless device 16 has transmitted an RRC connection request (step 702). If not, the process returns to step 700. If the wireless device 16 has transmitted an RRC connection request, the node determines whether the RSRP measured at the wireless device 16 is less than a predefined RSRP threshold (step 704). If not, the process returns to step 700. If the RSRP is less than the predefined RSRP threshold, the node determines whether the timer T300, which is launched, or started, upon transmission of the RRC connection request of step 702, has expired (step 706). If not, the process returns to step 700. If the timer T300 has expired, the node determines if a predefined extra delay that is in addition to the timer T300 has expired (step 708). If not, the process returns to step 700. If the extra delay has expired, the node determines that that wireless device 16 is to be in the long range extension mode (step 710). Otherwise, the wireless device 16 is to be in the normal mode of operation.

Figure 8:
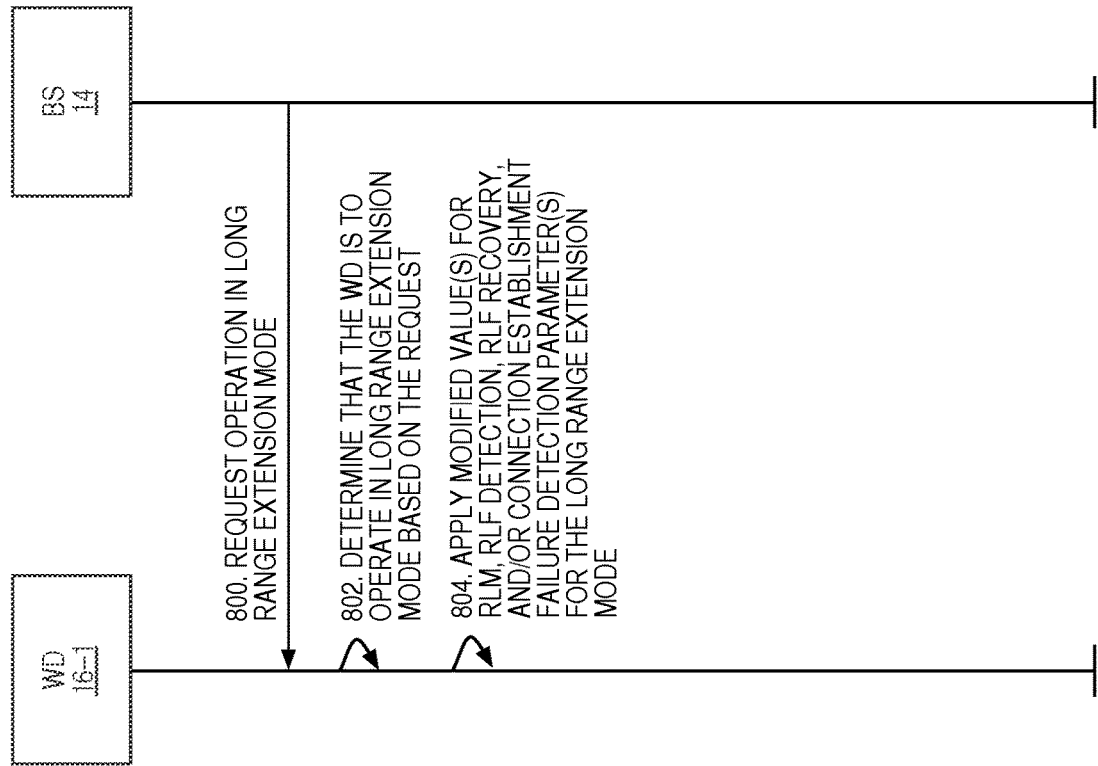
FIG. 8 illustrates the operation of the cellular communications network of FIG. 1 where one of the base stations sends a request to one of the wireless devices to operate in a long range extension mode of operation according to one embodiment of the present disclosure.

FIG. 8 illustrates the operation of the wireless device 16-1 to perform the process of FIG. 5 in response to a request from one of the base stations 14 according to one embodiment of the present disclosure. While the wireless device 16-1 is used in this example because it is an MTC device, the process can also be used for other wireless devices 16. As illustrated, the base station 14 sends a request to the wireless device 16-1 to operate in the long range extension mode (step 800). The base station 14 may send the request in response to deciding that the wireless device 16-1 is to operate in the long range extension mode using any suitable process or in response to receiving an instruction or other information from another node (e.g., another network node) for the wireless device 16-1, or based on a previous measurement, a message exchange, or knowledge in general that indicates that the wireless device 16-1 is to operate in the long range extension mode.

Upon receiving the request, the wireless device 16-1 performs the process of FIG. 5. Specifically, the wireless device 16-1 determines that the wireless device 16-1 is to operate in the long range extension mode of operation based on the request received from the base station 14 (step 802). The wireless device 16-1 then applies the modified value(s) for the RLM, RLF detection, RLF recovery, and/or connection establishment failure detection parameter(s) for the long range extension mode, as described above (step 804).

Figure 9:
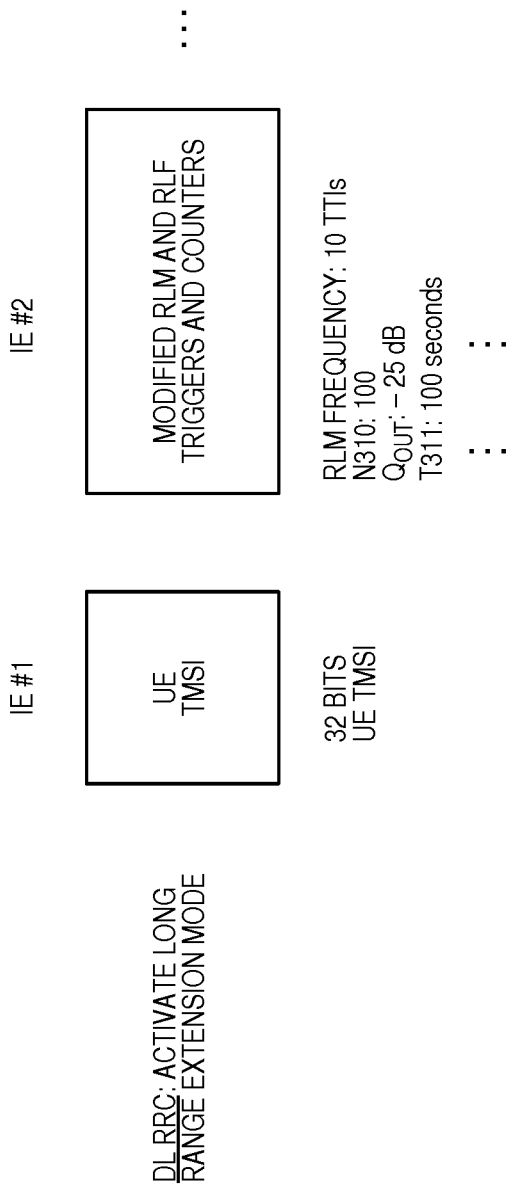
FIG. 9 illustrates one example of a Radio Resource Control (RRC) message that may be transmitted from the base station to the wireless device in the process of FIG. 8 to request that the wireless device operate in the long range extension mode according to one embodiment of the present disclosure.

In one embodiment, the request received from the base station 14 in step 800 of FIG. 8 may take the form of an RRC message that contains the modified values for the RLM, RLF detection, RLF recovery, and/or connection establishment failure parameters (or information that is indicative of the modified values). One example of such an RRC message is illustrated in FIG. 9. In this manner, the modified values for the RLM, RLF detection, RLF recovery, and/or connection establishment failure detection parameters for the long range extension mode of operation are configured by the cellular communications network 10. Specifically, in the example of FIG. 9, the RRC message includes a number of Information Elements (IEs). In this example, the second IE (IE #2) includes values for a number of parameters for the long range extension mode including values for a number of RLM, RLF detection, RLF recovery, and/or connection establishment failure detection parameters. In this example, the RRC message includes a value for an RLM frequency parameter (i.e., a frequency at which RLM is to be performed), a value for N310, a value for Qout, a value for T311, etc. In some embodiments, the RRC message containing the IE with the modified parameters is transmitted together with a request that the UE is to operate in long range extension mode. In other embodiments, the modified parameters to be used in long range extension mode are transmitted in a separate message, before or after the UE is entering the long range extension mode.

Figure 10:
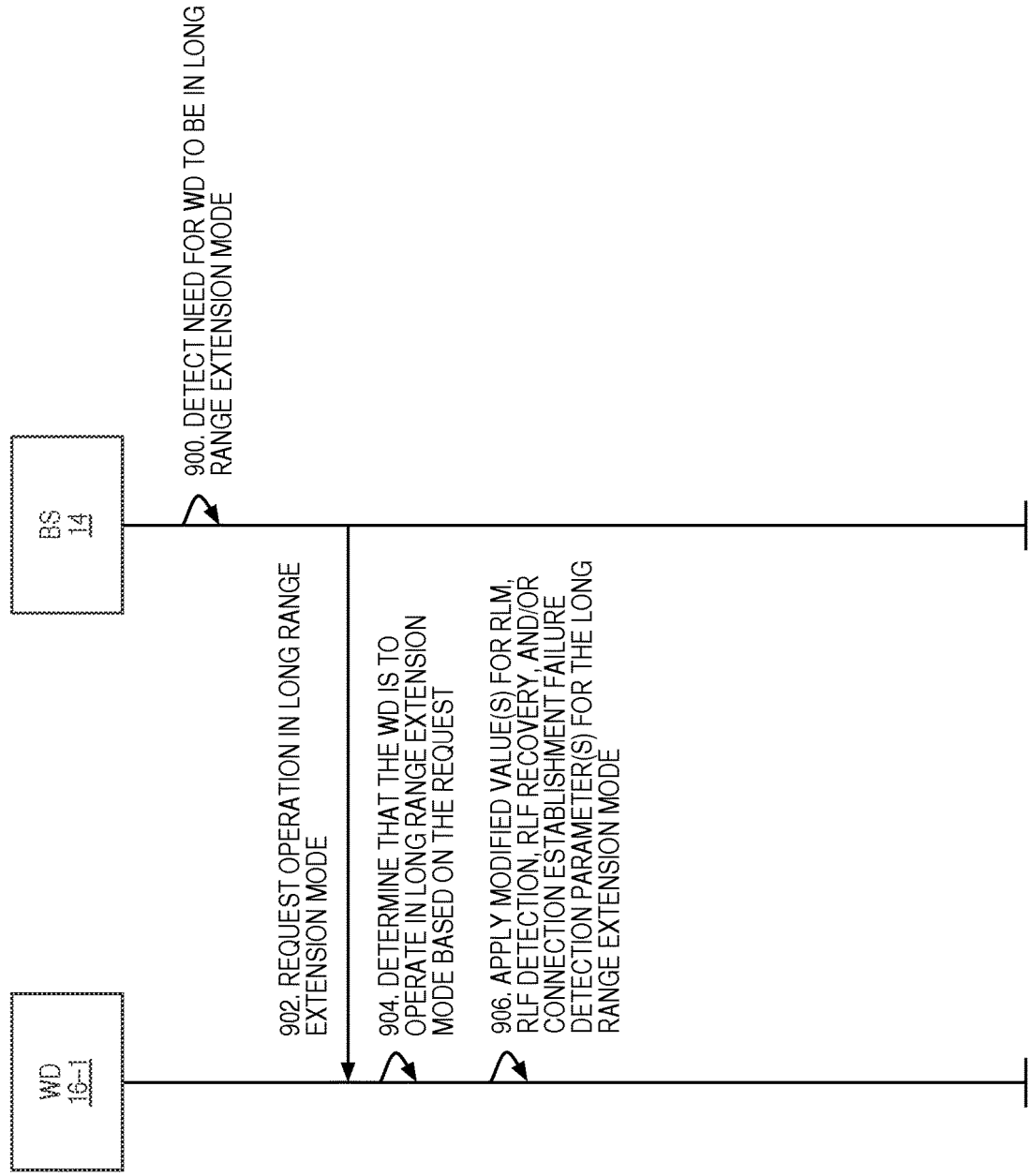
FIG. 10 illustrates an embodiment that is similar to that of FIG. 8 but where the base station further operates to detect that there is a need for the wireless device to operate in the long range extension mode according to one embodiment of the present disclosure.

FIG. 10 illustrates an embodiment that is substantially the same as that of FIG. 8 but where the base station 14 detects the need for the wireless device 16-1 to operate in the long range extension mode prior to sending a request to the wireless device 16-1. While the wireless device 16-1 is used in this example because it is an MTC device, the process can also be used for other wireless devices 16. As illustrated, the base station 14 detects the need for the wireless device 16-1 to operate in the long range extension mode (step 900). In one embodiment, the base station 14 detects the need for the wireless device 16-1 to operate in the long range extension mode when the wireless device 16-1 is a stationary device. As one example, the wireless device 16-1 may provide capability information (e.g., in an RRC message such as an RRC connection request) to the base station 14 (or previously to some other base station 14), where the capability information may include information indicating whether the wireless device 16-1 is stationary. However, any suitable process may be used by the base station 14 to detect when the wireless device 16-1 needs to operate in the long range extension mode.

Upon detecting that the wireless device 16-1 needs to operate in the long range extension mode, the base station 14 sends a request to the wireless device 16-1 to operate in the long range extension mode (step 902). It is noted here that considering that the base station 14 is aware of the need to use appropriate long range extension mode techniques when communicating with the wireless device 16-1, then this signaling of step 902 is done by using these specific techniques, such as e.g. repetitions, etc. Upon receiving the request, the wireless device 16-1 performs the process of FIG. 5. Specifically, the wireless device 16-1 determines that the wireless device 16-1 is to operate in the long range extension mode of operation based on the request received from the base station 14 (step 904). The wireless device 16-1 then applies the modified value(s) for the RLM, RLF detection, RLF recovery, and/or connection establishment failure detection parameter(s) for the long range extension mode, as described above (step 906). In one embodiment, the request received from the base station 14 in step 902 may take the form of an RRC message that contains the modified values for the RLM, RLF detection, RLF recovery, and/or connection establishment failure detection parameters (e.g., the RRC message of FIG. 9). In this manner, the modified values for the RLM, RLF detection, RLF recovery, and/or connection establishment failure detection parameters for the long range extension mode of operation are configured by the cellular communications network 10.

Figure 11:
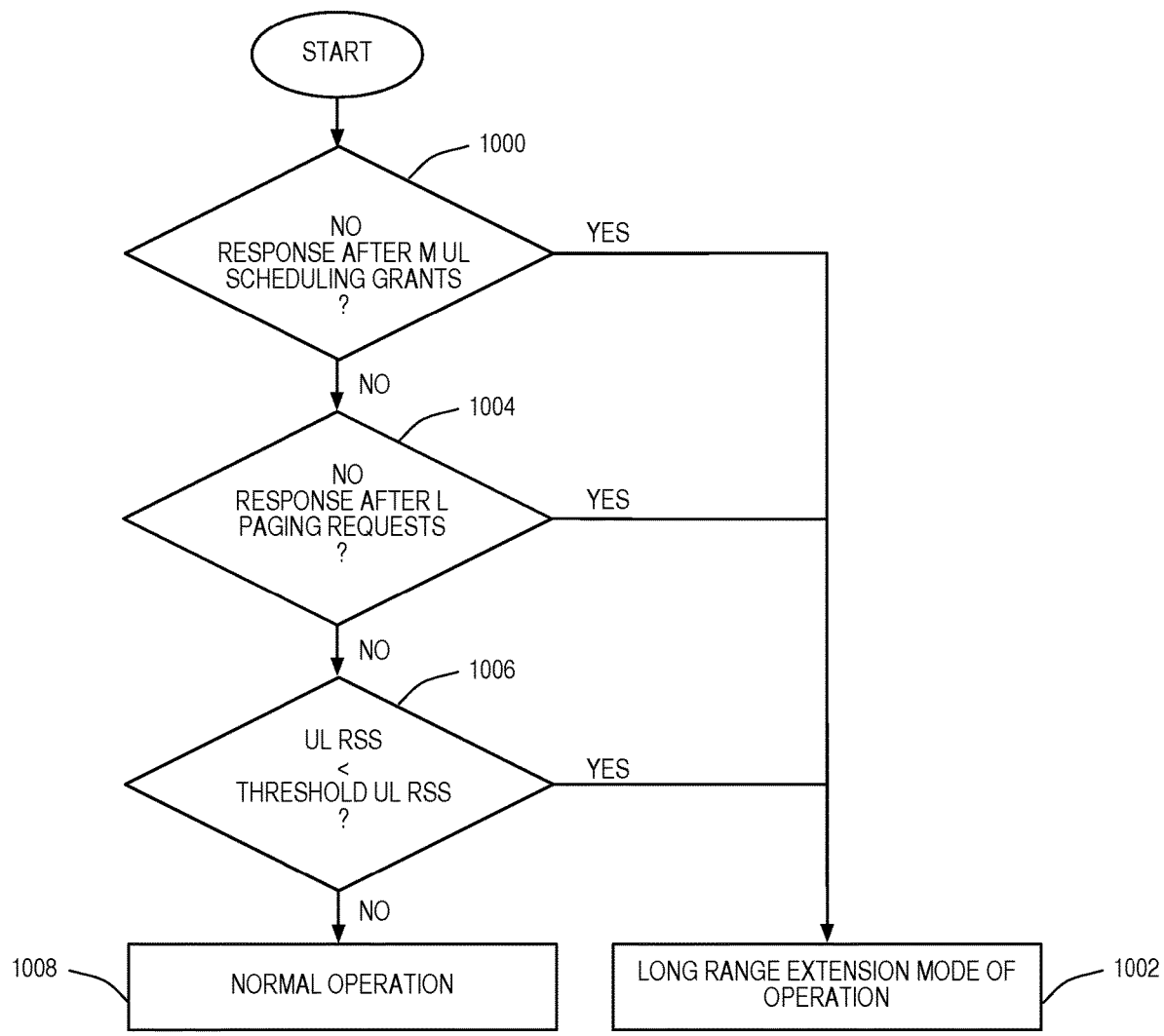
FIG. 11 illustrates a process by which a network node, such as the base station of FIG. 10, determines whether a wireless device is to operate in a long range extension mode or a normal mode according to one embodiment of the present disclosure.

FIG. 11 illustrates a process by which a network node such as, for example, the base station 14 of FIG. 10 detects, or determines, that the wireless device 16 is to operate in the long range extension mode according to one embodiment of the present disclosure. Note that the ordering of the steps in FIG. 11 is not important. In other words, the various criteria may be checked in any desired order. Further, not all steps may be performed. Specifically, the determination of whether the wireless device 16 is to operate in the long range extension mode may be made based on any one or more of the criteria indicated in FIG. 11.

As illustrated, the network node determines whether no response has been received from the wireless device 16 after a number, M, of uplink scheduling grants transmitted to the wireless device 16 (step 1000). If so, the network node determines that the wireless device 16 is to operate in the long range extension mode (step 1002). At that point, the modified value(s) for the RLM, RLF detection, RLF recovery, and/or connection establishment failure detection parameter(s) are applied with respect to the wireless device 16 (e.g., a request to operate in the long range extension mode is sent to the wireless device 16), as discussed above. Otherwise, the network node determines whether no response has been received from the wireless device 16 after a number, L, of paging requests for the wireless device 16

(step 1004). If so, the node determines that the wireless device 16 is to operate in the long range extension mode (step 1002). At that point, the modified value(s) for the RLM, RLF detection, RLF recovery, and/or connection establishment failure detection parameter(s) are applied with respect to the wireless device 16, as discussed above. Otherwise, the network node determines whether a received signal strength for any transmitted message, either data, uplink pilots, or uplink L1 signaling (e.g., PUCCH), transmitted in the uplink from the wireless device 16 is below a predefined uplink received signal strength threshold (step 1006). If so, the network node determines that the wireless device 16 is to operate in the long range extension mode (step 1002). At that point, the modified value(s) for the RLM, RLF detection, RLF recovery, and/or connection establishment failure detection parameter(s) are applied with respect to the wireless device 16, as discussed above. Otherwise, the network node determines that the wireless device 16 is to operate in the normal mode (step 1008). As an example, the values of M, L, and the uplink received signal strength threshold are 10, 10, and −120 dBm, respectively. Note that, in one embodiment, the network node permanently or continuously performs the process of FIG. 11.

Figure 12:
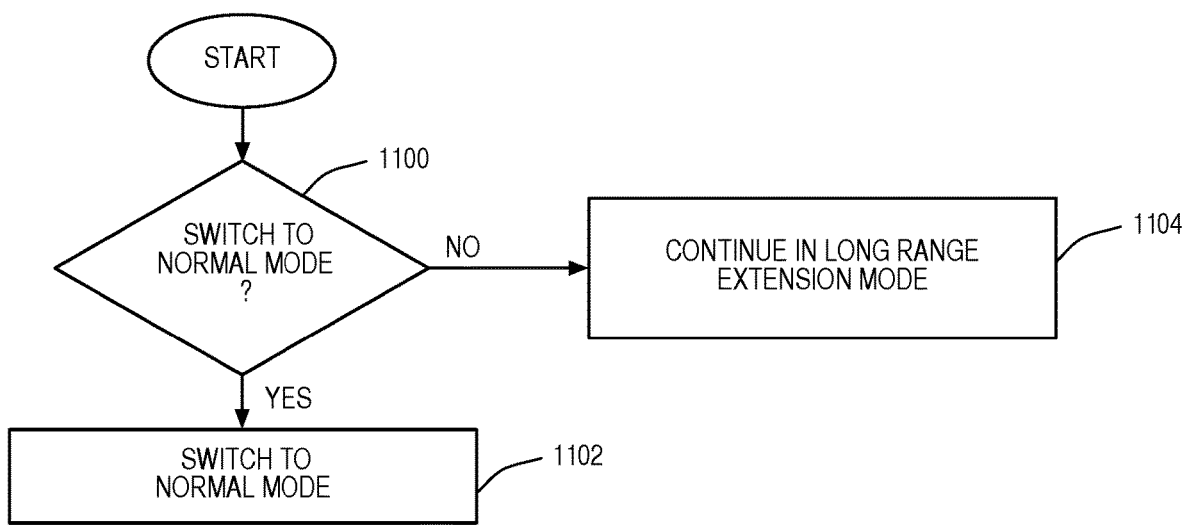
FIG. 12 illustrates a process by which a node determines whether a wireless device that is operating in a long range extension mode is to switch to a normal mode or remain in the long range extension mode according to one embodiment of the present disclosure.

The embodiments thus far have focused on determining when a wireless device 16 is to be in the long range extension mode. In contrast, FIG. 12 illustrates a process by which a node determines whether to switch a wireless device 16 that is operating in the long range extension mode to the normal mode (i.e., decides whether to deactivate the long range extension mode) according to one embodiment of the present disclosure. The node that performs this process may be a network node (e.g., one of the base stations 14) or the wireless device 16. As illustrated, the node first determines whether to switch the wireless device 16 to the normal mode (i.e., whether to deactivate the long range extension mode) (step 1100). While any suitable criteria can be used, in one embodiment, any of the criteria discussed above for determining whether the wireless device 16 is to operate in the long range extension mode or the normal mode can be used. If the wireless device 16 is to be switched to the normal mode, the node switches the wireless device 16 to the normal mode (step 1102). In addition to deactivating any range extension mechanisms, the node applies the normal values to the RLM, RLF detection, RLF recovery, and/or connection establishment failure detection parameters, as discussed above with respect to FIG. 5. Conversely, if the wireless device 16 is not to be switched to the normal mode, the node operates such that the wireless device 16 continues in the long range extension mode (step 1104).

Figure 13:
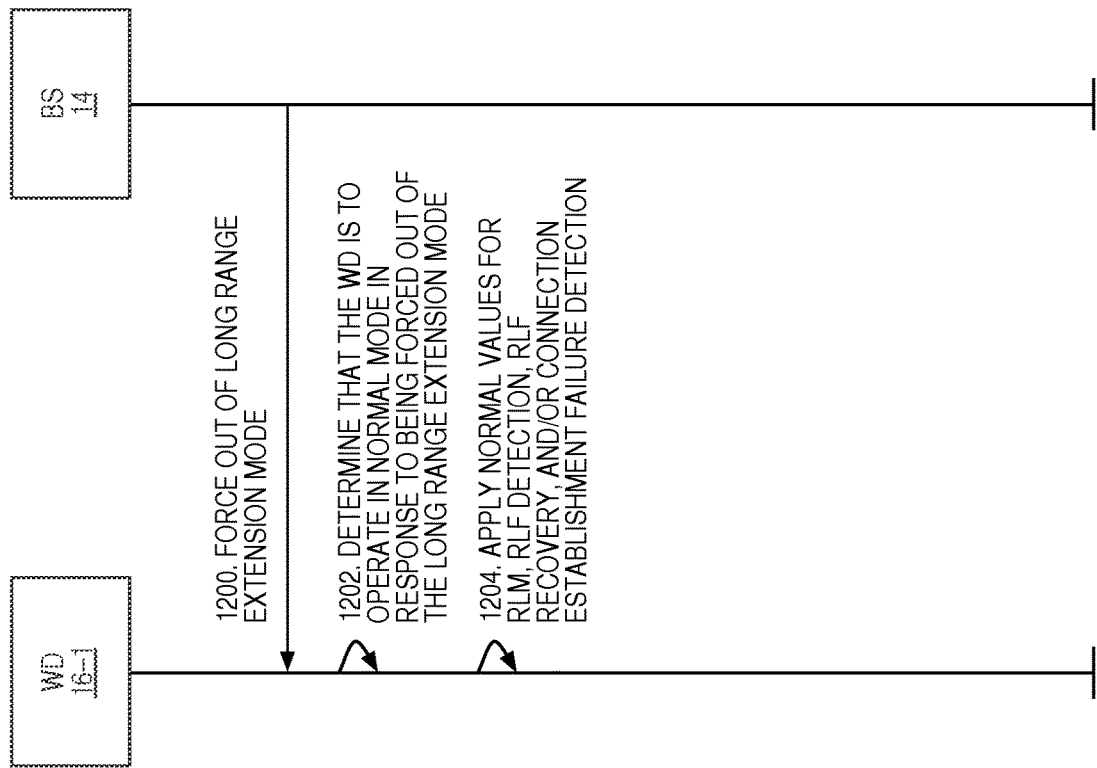
FIG. 13 illustrates the operation of the cellular communications network of FIG. 1 to force a wireless device that is operating in a long range extension mode into a normal mode according to one embodiment of the present disclosure.

In a similar manner, FIG. 13 illustrates a process by which the cellular communications network 10 forces the wireless device 16 out of the long range extension mode according to one embodiment of the present disclosure. Forcing the wireless device 16 out of the long range extension mode of operation may be desirable when, for example, the cellular communications network 10 does not allow long range extension mode of operation or the cellular communications network 10 has determined that admitting the wireless device 16 to enter into the long range extension mode would impact system capacity. This can be configured, for example, during certain times of the day when traffic on the system is high. As illustrated, the base station 14 sends a message to the wireless device 16-1 to force the wireless device 16-1 out of the long range extension mode of operation (step 1200). Note that, rather than sending the message in step 1200, the cellular communications network 10 may perform other actions that force the wireless device 16-1 out of the long range extension mode of operation. In response, the wireless device 16-1 determines that it is not to operate in the long range extension mode (step 1202) and therefore applies the normal values for the RLM, RLF detection, and RLF recovery parameters for the normal mode of operation (step 1204).

In any of the embodiments above, the decision of whether to communicate in the normal mode or the long range extension mode may be re-evaluated on a regular basis. An indication of re-evaluating the conditions for operating in this specific mode is, for example, detection of mobility either at the cellular communications network 10, or the wireless device 16.

The features of the above-mentioned embodiments may be used separately, or being combined in several possible ways. For example, it is possible that one embodiment is executed in the wireless device 16, and another embodiment is simultaneously executed in a network node.

In view of the above modifications and variations, those skilled in the art will appreciate that embodiments herein generally include a method of monitoring a wireless link between a wireless device 16 and a base station 14 in a cellular communications network 10 (or more generally a wireless communication system). In this regard, FIG. 14 illustrates one example of a process by which a wireless device 16 monitors a wireless link (e.g., a downlink and/or uplink) using different value(s) for corresponding parameters depending on whether the wireless device 16 is operating in a first mode (e.g., a normal mode) or a second mode (e.g., a long range extension mode) according to one embodiment of the present disclosure. As illustrated, the wireless device 16 determines whether it is to operate in a first mode of operation or a second mode of operation (step 1300). In this embodiment, when in the second mode of operation, the wireless device 16 is configured to maintain a wireless link with a corresponding base station 14 (e.g., the serving base station 14) over an extended range from the base station 14 as compared to that when operating in the first mode. The extended range in the second mode may come at the expense of one or more performance metrics of the wireless link (e.g., increased radio resources needed, decreased maximum throughput, increased energy consumption, and/or decreased system spectral efficiency). In one embodiment, the wireless device 16 determines whether it is to operate in the first or second mode comprises by autonomously making the mode decision. In another embodiment, the wireless device 16 determines whether it is to operate in the first or the second mode by receiving a message or command from the base station 14 indicating in which mode the wireless device 16 is to operate.

The wireless device 16 then configures at least one parameter for monitoring the wireless link for failure to have different values depending on whether the wireless device 16 is determined to operate in the first mode or the second mode (step 1302). In one embodiment, for instance, the at least one parameter is configured to have a mode-specific value that is specific to the second mode or that at least accounts for the wireless device's 16 operation in the second mode. The wireless device 16 then monitors the wireless link for failure in accordance with the at least one parameter (step 1304).

In the many of the embodiments above, RLM, RLF detection, and RLF recovery are performed by the wireless device 16. However, in other embodiments, RLM, RLF detection, and RLF recovery are performed by the base station 14. In this case, determining whether the wireless device 16 is to operate in the first or the second mode again comprises either autonomously making that mode decision at the base station 14 (and sending control signaling to the wireless device 16 indicating that decision) or receiving a message from another node, e.g., the wireless device 16, indicating the mode of the wireless device 16.

As discussed above, regardless of whether the wireless device 16 or the base station 14 determines the mode of operation, the value(s) of at least one parameter are configured to have a value that effectively imposes more relaxed requirements on the wireless link before failure of the link is declared when the wireless device 16 operates in the second mode (e.g., the long range extension mode) as compared to the value to which the parameter is configured when the wireless device 16 operates in the first mode (e.g., the normal mode). Configuring the at least one parameter in this way accounts for the expected nature of the wireless link quality at extended range and thereby advantageously prevents unnecessary link failure declarations.

In other embodiments, configuration of the value(s) for the at least one parameter entails configuring the at least one parameter to have a value that effectively increases the reliability of a decision about whether the wireless link has failed when the wireless device 16 operates in the second mode (e.g., the long range extension mode) as compared to the value to which the parameter is configured when the wireless device 16 operates in the first mode. Configuration of the at least one parameter may for instance effectively increase the amount of time to determine whether failure of the wireless link should be declared. Regardless, configuring the at least one parameter in this way accounts for the expected increase in the difficulty of reliably estimating wireless link quality at extended range and thereby advantageously prevents incorrect link failure declarations.

In any event, as discussed above, the at least one parameter configured in some embodiments comprises a frequency with which measurements of the quality of the wireless link are performed. In this case, configuration entails configuring the frequency to have a lower value when the wireless device 16 operates in the second mode (e.g., the long range extension mode) as compared to the value to which the frequency is configured when the wireless device 16 operates in the first mode (e.g., the normal mode). That is, link quality measurements are performed less often when the wireless device 16 operates in the second mode than when the wireless device 16 operates in the first mode. In some embodiments, for example, the link quality measurements are performed every R TTIs when the wireless device 16 operates in the second mode (where R>1) and are performed every 1 TTI when the wireless device 16 operates in the first mode, or radio link measurements are performed every TTI and the mean value measured over R TTIs is used.

Additionally or alternatively, the at least one parameter configured in some embodiments comprises a threshold of the quality of the wireless link below which a failure of the wireless link is triggered/declared (i.e., detected) (or above which recovery of the wireless link from a failure is declared). In this case, configuration entails configuring the threshold to have a lower value when the wireless device 16 operates in the second mode (e.g., the long range extension mode) as compared to the value to which the threshold is configured when the wireless device 16 operates in the first mode (e.g., the normal mode). In one embodiment, for example, the threshold comprises Qout as described above. Additionally or alternatively, the threshold comprises Qin as described above.

Additionally or alternatively, the at least one parameter configured in some embodiments comprises a timer whose value defines how long the wireless device 16 waits to receive a response to a certain message sent to the system before taking a certain action associated with declaring failure or recovery of the wireless link. In this case, configuration entails configuring the timer to have a longer value when the wireless device 16 operates in the second mode (e.g., the long range extension mode) as compared to the value to which the timer is configured when the wireless device 16 operates in the first mode (e.g., the normal mode). That is, the wireless device 16 waits for longer in the second mode than when in the first mode before taking action associated with declaring failure or recovery of the wireless link. In one embodiment, for example, the timer comprises T300, T301, T304, T310, and/or T311 as described above, or such a timer plus an extra delay.

Additionally or alternatively, the at least one parameter configured in other embodiments comprises a count threshold whose value defines how many times the wireless device 16 re-transmits a certain message to the system before taking a certain action associated with declaring failure or recovery of the wireless link. In this case, configuration entails configuring the count threshold to have a larger value when the wireless device 16 operates in the second mode (e.g., the long range extension mode) as compared to the value to which the count threshold is configured when the wireless device 16 operates in the first mode (e.g., the normal node). That is, the wireless device 16 re-transmits the certain message more times before taking a certain action when operating in the second mode than in the first mode. In one embodiment, for example, the count threshold comprises N310 as described above.

Further, some or all of the embodiments disclosed herein may be performed or applied with respect to wireless devices 16 (e.g., MTC devices such as sensors) that are known to be stationary. In one exemplary embodiment, these wireless devices 16 provide information (e.g., capability information) to the cellular communications network 10 (e.g., to their serving base stations 14) that indicates that these wireless devices 16 are stationary. The wireless devices 16 that are known to be stationary and, in some embodiments, meet one or more additional criteria (e.g., poor radio propagation path or difficulty in establishing or maintaining communication with the cellular communications network 10) may be operated in the long range extension mode. Further, as discussed above, one or more modified value(s) are then applied for at least one RLM, RLF detection, RLF recovery, and/or connection establishment failure detection parameter for the wireless devices 16 in the long range extension mode.

FIG. 15 is a block diagram of one of the base stations 14 of FIG. 1 according to one embodiment of the present disclosure. Note that the architecture of FIG. 15 also applies to other network nodes but not all network nodes (e.g., a core network node) may include a wireless interface. As illustrated, the base station 14 includes a wireless interface 20 (e.g., transceiver circuits) and one or more control and processing circuits 22. The base station 14 may further include one or more other communication interfaces 24 (e.g., for interfacing with other network nodes). The wireless interface 20 may include various radio frequency components to receive and process radio signals from one or more other wireless nodes (e.g., the wireless devices 16) using known signal processing techniques. The one or more control and processing circuits 22 may comprise one or more microprocessors, digital signal processors, and the like. The one or more control and processing circuits 22 may also comprise other digital hardware and a memory (e.g., Read Only Memory (ROM), Random Access Memory (RAM), cache, flash, etc.) that stores program code for executing one or more communications protocols and for carrying out one or more of the techniques above. Regardless, the one or more control and processing circuits 22 are configured to perform the functions of the base station 14 described herein. As shown, in some embodiments, the one or more control and processing circuits 22 include a mode controller 26 for controlling the mode of operation (e.g., normal mode or long range extension mode) of one or more wireless devices 16 and a parameter configuration circuit 28 that operates to configure value(s) for one or more parameters for either the long range extension mode of operation or the normal mode of operation of the wireless devices 16 as controlled by the mode controller 26 as discussed above.

FIG. 16 is a block diagram of one of the wireless devices 16 of FIG. 1 according to one embodiment of the present disclosure. As illustrated, the wireless device 16 includes a wireless interface 30 (e.g., transceiver circuits) and one or more control and processing circuits 32. The wireless interface 30 may include various radio frequency components to receive and process radio signals from one or more other wireless nodes (e.g., the base stations 14) using known signal processing techniques. The one or more control and processing circuits 32 may comprise one or more microprocessors, digital signal processors, and the like. The one or more control and processing circuits 32 may also comprise other digital hardware and a memory (e.g., ROM, RAM, cache, flash, etc.) that stores program code for executing one or more communications protocols and for carrying out one or more of the techniques above. Regardless, the one or more control and processing circuits 32 are configured to perform the functions of the wireless device 16 described herein. As shown, in this example, the one or more control and processing circuits 32 include a mode controller 34 for controlling the mode of operation (e.g., normal mode or long range extension mode) of the wireless device 16 (e.g., autonomously or under the control of the cellular communications network 10), a parameter configuration circuit 36 that operates to configure value(s) for one or more parameters for either the long range extension mode of operation or the normal mode of operation of wireless device 16 as controlled by the mode controller 34, and a link monitoring circuit 38 that operates to monitor a wireless link of the wireless device 16 (e.g., for RLM, RLF detection, RLF recovery, and/or connection establishment failure detection) as described above.

Those skilled in the art will also appreciate that the above embodiments have been described as non-limiting examples, and have been simplified in many respects for ease of illustration. In this regard, no particular communication standard is necessary for practicing the embodiments herein. For example, the system herein may comprise a cellular communications network, a Wireless Sensor Network (WSN), or some other type of MTC network. A wireless device herein may correspondingly comprise a mobile terminal, a UE, a laptop computer, a wireless sensor, an MTC device, or the like. Thus, the term wireless device is generally intended to include standalone wireless devices, such as cellphones and wireless-equipped personal digital assistants, as well as wireless cards or modules that are designed for attachment to or insertion into another electronic device, such as a personal computer, an electrical meter, etc. Likewise, a base station herein may comprise a Node B in Wideband Code Division Multiple Access (WCDMA) networks or an eNB in LTE networks, a gateway, or any other type of node that provides the wireless devices with wireless access to the system.

Further, those skilled in the art will appreciate that many of the embodiments above have not been described in the context of any particular wireless communication standard. Indeed, no particular wireless communication standard is necessary for practicing the embodiments of the present disclosure. That is, the wireless communications network may be any one of a number of standardized network implementations such as WCDMA, High Speed Packet Access (HSPA), LTE, LTE-Advanced, Code Division Multiple Access (CDMA) 2000, or the like.

Those skilled in the art will recognize that the foregoing description presents non-limiting examples of advantages, features, and embodiments of the present disclosure.

The following acronyms are used throughout this disclosure.

| | |
|---|---|
| 3GPP | $3^{rd}$ Generation Partnership Project |
| ASIC | Application Specific Integrated Circuit |
| BLER | Block Error Rate |
| dB | Decibel |
| dBm | Decibel-Milliwatt |
| CDMA | Code Division Multiple Access |
| D2D | Device-to-Device |
| DCI | Downlink Control Indication |
| EGPRS | Enhanced General Packet Radio Service |
| eNB | Evolved Node B |
| FDD | Frequency Division Duplexing |
| GPRS | General Packet Radio Service |
| GSM | Global System for Mobile Communications |
| HSPA | High Speed Packet Access |
| IE | Information Element |
| Kbps | Kilobits per Second |
| LTE | Long Term Evolution |
| M2M | Machine-to-Machine |
| MME | Mobility Management Entity |
| ms | Millisecond |
| MTC | Machine Type Communication |
| PCFICH | Physical Control Format Indicator Channel |
| PDCCH | Physical Downlink Control Channel |
| RA | Random Access |
| RAM | Random Access Memory |
| RAN | Radio Access Network |
| RLF | Radio Link Failure |
| RLM | Radio Link Monitoring |
| ROM | Read Only Memory |
| RRC | Radio Resource Control |
| RSRP | Reference Signal Received Power |
| RSRQ | Reference Signal Received Quality |
| SAE | System Architecture Evolution |
| SID | Study Item Description |
| SINR | Signal-to-Interference-and-Noise Ratio |
| TDD | Time Division Duplexing |
| TR | Technical Report |
| TS | Technical Specification |
| TTI | Transmission Time Interval |
| UE | User Equipment |
| WCDMA | Wideband Code Division Multiple Access |
| WSN | Wireless Sensor Network |

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communications network, comprising:
   determining whether a wireless device is to operate in a long range extension mode or a normal mode where the long range extension mode is a mode of operation in which the wireless device is configured to maintain communication with the base station of the cellular communications network over an extended coverage range as compared to a coverage range over which the wireless device is configured to maintain communication with the base station of the cellular communications network in the normal mode of operation; and applying different values for at least one parameter utilized by the wireless device for radio link failure detection depending on whether the wireless device is to operate in the long range extension mode or the normal mode, wherein the base station determines that the wireless device is to operate in the long range extension mode in response to a request from the cellular communications network and sends a request causing the wireless device to apply, for each parameter of the at least one parameter, a modified value for the long range extension mode that is different than that which would be applied for the normal mode of operation.

2. The method of claim 1 wherein the at least one parameter comprises N310.

3. The method of claim 2, wherein the modified value for N310 is greater than 20.

4. The method of claim 1, wherein the at least one parameter utilized by the wireless device for radio link failure detection comprises T310.

5. The method of claim 4, wherein the modified value for T310 is greater than 2000 milliseconds.

6. The method of claim 1 further comprising performing a procedure to determine whether the wireless device is to be in the long range extension mode or the normal mode in response to determining that the wireless device is in an idle mode, the wireless device has transmitted a Radio Resource Control (RRC) Connection Request, a Reference Signal Received Power (RSRP) measured by the wireless device is less than a predefined RSRP threshold, a timer T300 has expired, and an additional delay has expired.

7. The method of claim 1 further comprising determining whether the wireless device is to operate in the long range extension mode or the normal mode if at least one condition exists of the group consisting of:

the cellular communications network does not receive a response after a predefined number of uplink scheduling grants transmitted to the wireless device;

the cellular communications network does not receive a response after a predefined number of paging requests for the wireless device; and an uplink received strength of signal for the wireless device is less than a predefined threshold uplink received strength of signal.

8. The method of claim 1 wherein applying the different values for the at least one parameter comprises:

configuring the at least one parameter with the different values depending on whether the wireless device is to operate in the long range extension mode or the normal mode; and monitoring a radio link between the wireless device and the cellular communications network for failure in accordance with the at least one parameter.

9. A base station for operation in a cellular communications network, comprising:

a wireless interface; and one or more control and processing circuits associated with the wireless interface and configured to:

determine whether a wireless device is to operate in a long range extension mode or a normal mode where the long range extension mode is a mode of operation in which the wireless device is configured to maintain communication with the base station of the cellular communications network over an extended coverage range as compared to a coverage range over which the wireless device is configured to maintain communication with the base station of the cellular communications network in the normal mode of operation; and apply different values for at least one parameter utilized by the wireless device for radio link failure detection depending on whether the wireless device is to operate in the long range extension mode or the normal mode, wherein the base station determines that the wireless device is to operate in the long range extension mode in response to a request from the cellular communications network and sends a request causing the wireless device to apply, for each parameter of the at least one parameter, a modified value for the long range extension mode that is different than that which would be applied for the normal mode of operation.

10. A method of operation of a wireless device in a cellular communications network, comprising:

determining whether the wireless device is to operate in a long range extension mode or a normal mode where the long range extension mode is a mode of operation in which the wireless device is configured to maintain communication with a base station of the cellular communications network over an extended coverage range as compared to a coverage range over which the wireless device is configured to maintain communication with the base station of the cellular communications network in the normal mode of operation; and applying different values for at least one parameter utilized by the wireless device for radio link failure detection depending on whether the wireless device is to operate in the long range extension mode or the normal mode, wherein:

the wireless device determines that it is to operate in the long range extension mode in response to a request from the cellular communications network; and applying the different values comprises applying, for each parameter of the at least one parameter, a modified value for the long range extension mode that is different than that which would be applied for the normal mode of operation.

11. The method of claim 10 wherein the at least one parameter comprises N310.

12. The method of claim 11, wherein the modified value for N310 is greater than 20.

13. The method of claim 10, wherein the at least one parameter utilized by the wireless device for radio link failure detection comprises T310.

14. The method of claim 13, wherein the modified value for T310 is greater than 2000 milliseconds.

15. The method of claim 10 wherein the request comprises the modified value for the long range extension mode for each parameter of the at least one parameter.

16. The method of claim 10 wherein applying the different values for the at least one parameter comprises:

configuring the at least one parameter with the different values depending on whether the wireless device is to operate in the long range extension mode or the normal mode; and monitoring a radio link between the wireless device and the cellular communications network for failure in accordance with the at least one parameter.

17. A wireless device for operation in a cellular communications network, comprising:
a wireless interface; and
one or more control and processing circuits associated with the wireless interface and configured to:
determine whether the wireless device is to operate in a long range extension mode or a normal mode where the long range extension mode is a mode of operation in which the wireless device is configured to maintain communication with a base station of the cellular communications network over an coverage extended range as compared to a coverage range over which the wireless device is configured to maintain communication with the base station of the cellular communications network in the normal mode of operation; and
apply different values for at least one parameter utilized by the wireless device for radio link failure detection depending on whether the wireless device is to operate in the long range extension mode or the normal mode, wherein:
the wireless device determines that it is to operate in the long range extension mode in response to a request from the cellular communications network; and
being configured to apply the different values comprises being configured to apply, for each parameter of the at least one parameter, a modified value for the long range extension mode that is different than that which would be applied for the normal mode of operation.

\* \* \* \* \*